United States Patent
Rupley, II et al.

(10) Patent No.: US 9,977,674 B2
(45) Date of Patent: May 22, 2018

(54) MICRO-OPERATION GENERATOR FOR DERIVING A PLURALITY OF SINGLE-DESTINATION MICRO-OPERATIONS FROM A GIVEN PREDICATED INSTRUCTION

(75) Inventors: Jeffrey P. Rupley, II, Round Rock, TX (US); Edward A. Brekelbaum, Austin, TX (US); Edward T. Grochowski, San Jose, CA (US); Bryan P. Black, Austin, TX (US)

(73) Assignee: Intel Corporation, Santa Clara, CA (US)

(*) Notice: Subject to any disclaimer, the term of this patent is extended or adjusted under 35 U.S.C. 154(b) by 0 days. days.

(21) Appl. No.: 10/685,654

(22) Filed: Oct. 14, 2003

(65) Prior Publication Data
US 2005/0081017 A1 Apr. 14, 2005

(51) Int. Cl.
*G06F 9/30* (2018.01)
*G06F 9/38* (2018.01)

(52) U.S. Cl.
CPC ........ *G06F 9/30043* (2013.01); *G06F 9/3017* (2013.01); *G06F 9/30072* (2013.01); *G06F 9/30145* (2013.01); *G06F 9/30167* (2013.01); *G06F 9/384* (2013.01); *G06F 9/3836* (2013.01)

(58) Field of Classification Search
CPC .................... G06F 9/30072; G06F 9/30145
USPC ........................................ 712/236, 208, 245
See application file for complete search history.

(56) References Cited

U.S. PATENT DOCUMENTS

| | | | |
|---|---|---|---|
| 5,537,560 A * | 7/1996 | Boggs | G06F 9/30032 712/23 |
| 6,170,052 B1 * | 1/2001 | Morrison | 712/236 |
| 6,871,275 B1 * | 3/2005 | Poplingher et al. | 712/237 |
| 2002/0112148 A1 | 8/2002 | Wang et al. | |

OTHER PUBLICATIONS

Intel Corp., "Intel® Itanium™ Architecture Software Developer's Manual", Dec. 2001, vol. 1: Application Architecture, Revision 2.0, pg. 1:47-1:49.*
Carol Dulong, "The IA-64 Architecture at Work", 1998, Intel Corp., p. 1.*
Microsoft® Computer Dictionary, 2002, Microsoft Press, Fifth Edition, p. 556.*
R. E. Kessler, "The Alpha 21264 Microprocessor", IEEE Micro, Mar.-Apr. 1999, pp. 24-36.

* cited by examiner

*Primary Examiner* — Benjamin P Geib
(74) *Attorney, Agent, or Firm* — Nicholson De Vos Webster & Elliott LLP

(57) ABSTRACT

Disclosed are an apparatus, system, and method for implementing predicated instructions using micro-operations. A micro-code engine receives an instruction, decomposes the instruction, and generates a plurality of micro-operations to implement the instruction. Each of the decomposed micro-operations indicates a single destination register. For predicated instructions, the decomposed micro-operations include "conditional move" micro-operations to select between two potential output values. Except in the case that one of the potential output values is a constant, the decomposed micro-operations for a predicated instruction also include an append instruction that saves the incoming value of a destination register in a temporary variable. For at least one embodiment, the qualifying predicate for a predicated instruction is appended to the incoming value stored in the temporary register.

47 Claims, 11 Drawing Sheets

Before:

902

- - - - - - - -

After:

904

MICRO-OPERATION GENERATOR FOR DERIVING A PLURALITY OF SINGLE-DESTINATION MICRO-OPERATIONS FROM A GIVEN PREDICATED INSTRUCTION

BACKGROUND

Technical Field

The present disclosure relates generally to information processing systems and, more specifically, to processors that utilize predication.

Background Art

In modern processor designs, one method of increasing performance is executing multiple instructions per clock cycle. The performance of such processors is dependent on the amount of instruction level parallelism (ILP) exposed by the compiler and exploited by the microarchitecture. One approach for increasing the amount of ILP that is available for compile-time instruction scheduling is predication. Predication is also useful for decreasing the number of branch mispredictions.

Predication is a method of converting control flow dependencies to data dependencies. A predicated execution model is an architectural model where an instruction is guarded by a Boolean operand whose value determines if the instruction is executed or nullified. For example, the Explicitly Parallel Instruction Computing ("EPIC") architecture utilized by Itanium® and Itanium® 2 microprocessors features a set of 64 predicate registers to support conditional execution of instructions by providing the Boolean predication operand.

To explore ILP, a compiler can take full advantage of predication by applying a technique referred to as if-conversion to convert control flow dependence into data flow dependence. With if-conversion, the compiler can collapse multiple control flow paths and schedule them based only on data dependencies.

The Itanium® and Itanium® 2 microprocessors, for instance, support predication and issue instructions in program order. However, predication may also provide performance benefits for processors that allow instructions to issue out-of-order. An out-of-order, execution model is, in general, more complex than a static execution model. Static execution executes code in the order as scheduled statically by the compiler while out-of order execution permits the processor to dynamically adjust instruction scheduling to the run-time behavior of the program.

Because of this ability to adapt to the run-time environment, dynamic out-of-order execution has been employed in many processor designs. For processors that allow instructions to issue out of order, register renaming is used to increase the number of instructions that a superscalar processor can issue in parallel. Renaming each independent definition of an architectural register to different physical registers in a physical register file improves parallelism by preventing dependence-induced delays. Renaming removes WAR (write-after-read) and WAW (write-after-write) dependencies and allows multiple independent instructions that write to the same architectural register to issue concurrently.

Efficiency of the renaming mechanism in an out-of-order processor may drive processor performance. That is, the renaming mechanism and its associated physical register file may represent critical resources for an out-of-order processor architecture. Implementation of predication on such processors poses interesting issues.

BRIEF DESCRIPTION OF THE DRAWINGS

The present invention may be understood with reference to the following drawings in which like elements are indicated by like numbers. These drawings are not intended to be limiting but are instead provided to illustrate selected embodiments of a method, apparatus and system for implementing predicated instructions using micro-operations.

DETAILED DESCRIPTION

Described herein are selected embodiments of a system, apparatus and methods for implementing predicated instructions using micro-operations. In the following description, numerous specific details such as processor types, pipeline stages, instruction formats, renaming mechanisms, and control flow ordering have been set forth to provide a more thorough understanding of the present invention. It will be appreciated, however, by one skilled in the art that the invention may be practiced without such specific details. Additionally, some well-known structures, circuits, and the like have not been shown in detail to avoid unnecessarily obscuring the present invention.

Figure 1:
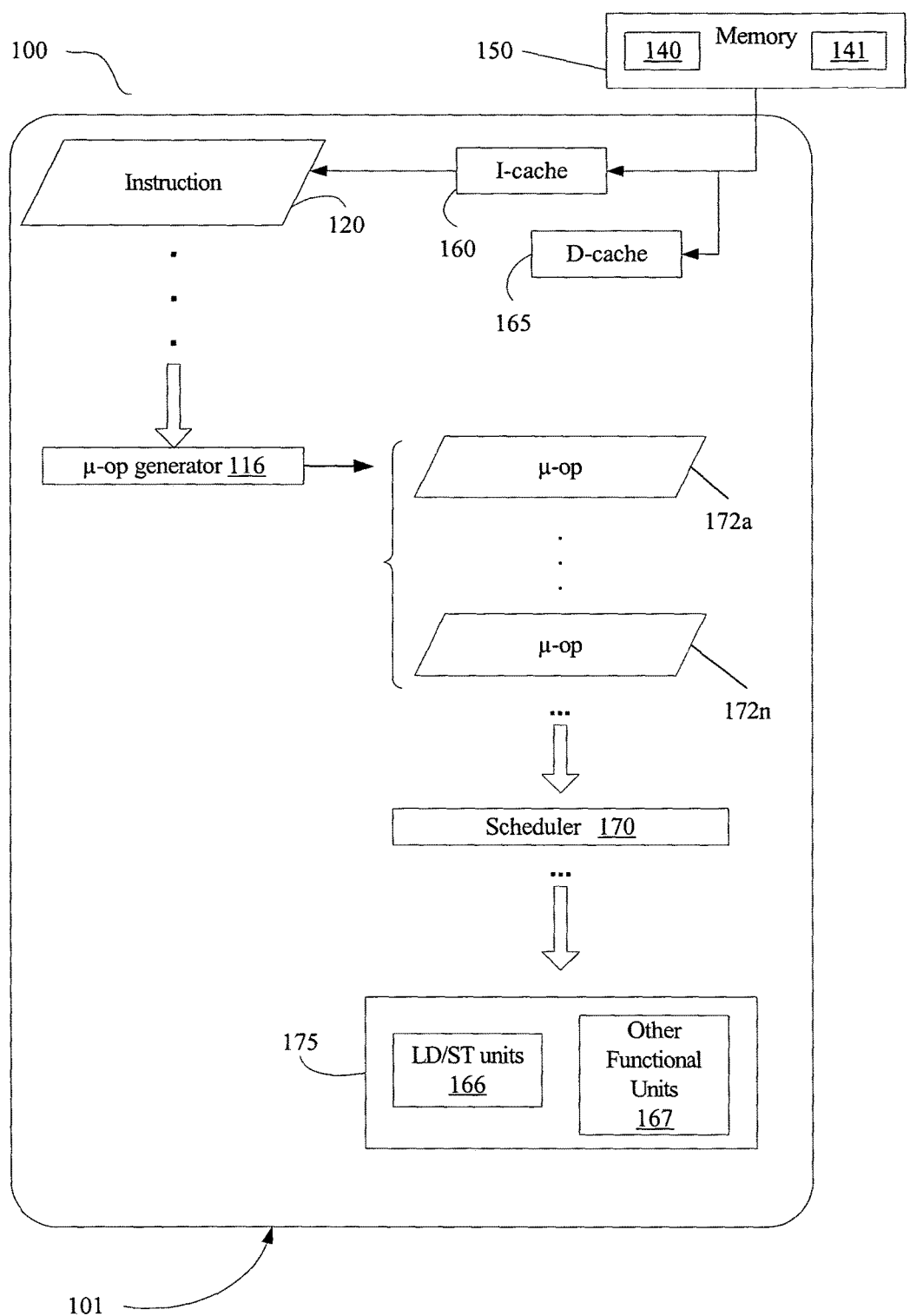
FIG. 1 is a block diagram of at least one embodiment of a processing system capable of utilizing disclosed techniques.

FIG. 1 is a block diagram illustrating at least one embodiment of a processing system 100 capable of decomposing predicated and non-predicated instructions into multiple micro-operations called "micro-ops" or "µ-ops." The instructions to be decomposed may include both arithmetic and memory instructions. FIG. 1 illustrates that processing system 100 includes a memory 150 in which the instructions may be stored. The processing system 100 also includes a processor 101 to perform out-of-order execution of predicated and non-predicated instructions. The processor 101 utilizes a pipeline 300 (see FIG. 3), which includes multiple dynamic pipeline stages.

More specifically, at least one embodiment of processor 101 includes a micro-code engine, referred to herein as µ-op generator 116, to decompose instructions into a series of micro-operations. For each instruction 120, the μ-op generator 116 generates a series of micro-operations 172a-172n. The micro-operations 172a-172n include "standard" micro-ops that are generated regardless of whether the instruction 120 is predicated. If the instruction 120 is predicated, the micro-operations 172a-172n include additional predication-support micro-ops.

The resultant micro-operations 172a-172n, including the standard micro-ops and any additional predication support micro-ops, each specify a single destination register, even if the original instruction 120 indicates multiple destination registers. It is the resultant micro-operations 172a-172n that are executed, rather than the predicated instruction 120, by execution units 175. Of course, ellipses in FIG. 1 indicate that additional operations (such as, for example, register renaming) may be performed on the resultant micro-operations 172a-172n before execution by the execution units 175.

Also, one of skill in the art will recognize that additional operations may be performed on the instruction 120 before the μ-op generator 116 receives the instruction 120. For example, the instruction 120 may be fetched from an instruction cache 160 and may also be decoded before being forwarded to the μ-op generator 116. In addition, responsive to a cache miss in the instruction cache 160, the instruction 120 may be retrieved from an instruction space 140 in the memory 150.

Figure 2:
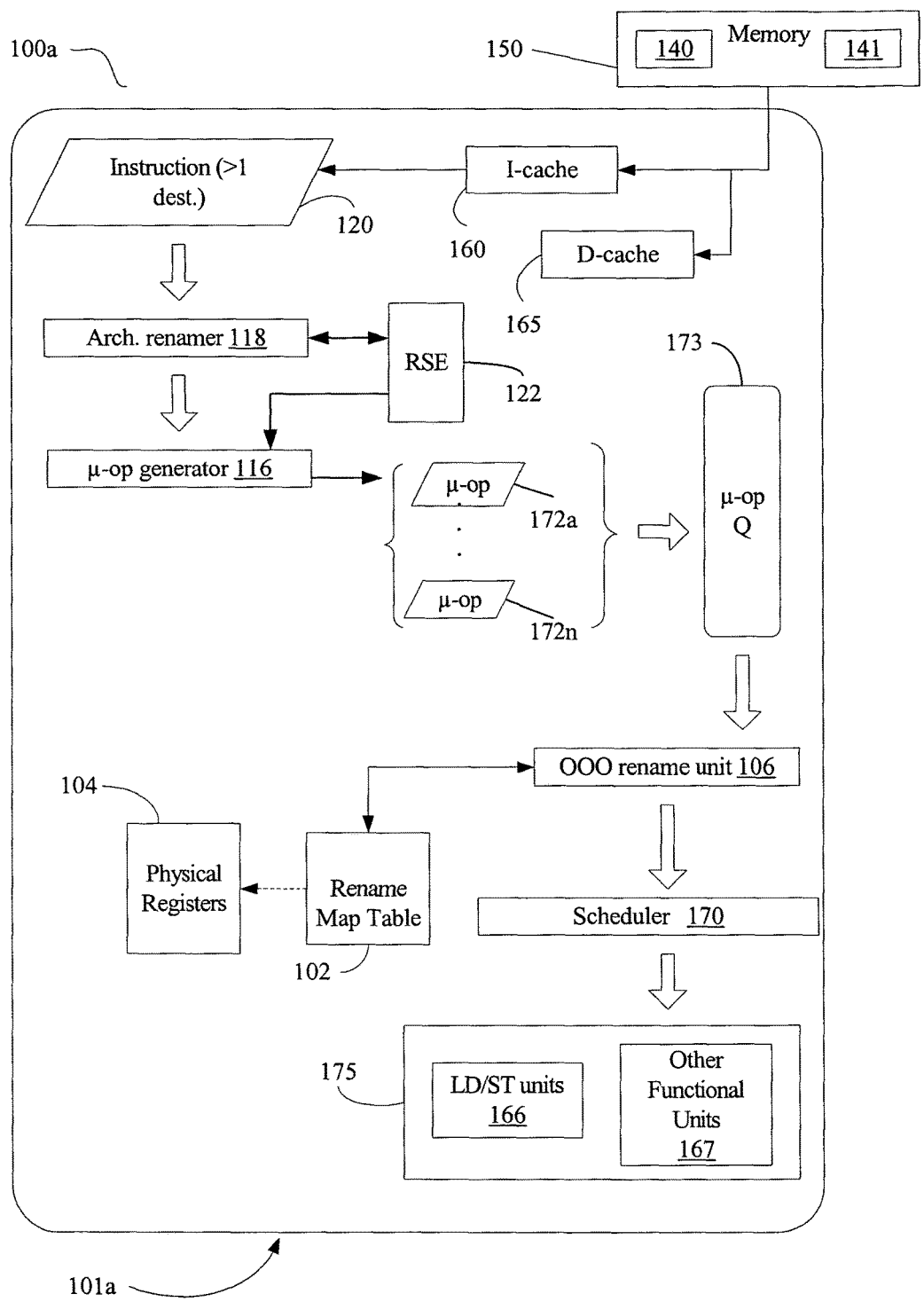
FIG. 2 is a block diagram illustrating micro-architectural features of at least one embodiment of a processor.

FIG. 2 illustrates additional micro-architectural details for at least one embodiment of a processor 101a. Processor 101a includes physical registers 104 and a rename map table 102. The processor 101 also includes an out-of-order ("OOO") register rename unit 106. The OOO rename unit 106, map table 102 and physical registers 104 are all utilized for the purpose of OOO register renaming.

Out-of-order rename unit 106 performs renaming by mapping an architectural register to a physical register 104 in order to dynamically increase ILP in the instruction stream. That is, for each occurrence of an architectural register in an instruction in the instruction stream of the processor 101a, out-of-order rename unit 106 may map such occurrence to a physical register. As used herein, the term "instruction" is intended to encompass any type of instruction that can be understood and executed by functional units 175, including macro-instructions and micro-operations. One of skill in the art will recognize that renaming may be performed concurrently for multiple threads.

During out-of-order renaming for architectural registers, at least one embodiment of the out-of-order rename unit 106 enters data into the map table 102. The map table 102 is a storage structure to hold one or more rename entries. In practice, the actual entries of the map table 102 form a translation table that keeps track of mapping of architectural registers, which are defined in the instruction set, to physical registers 104. The physical registers 104 may maintain intermediate and architected data state for the architectural register being renamed.

Accordingly, it has been described that the map table 102 and physical registers 104 facilitate renaming, by renamer unit 106, of architectural registers defined in an instruction set. The renaming may occur during an out-of-order rename pipeline stage 308 (see FIG. 3).

FIG. 2 illustrates that an embodiment 101a of a processor may also include an architectural renamer 118 to provide renaming that supports register windowing and register rotation. For such embodiment, a portion of the registers in the processor 101 is utilized to implement a register stack to provide fresh registers, called a register frame (also referred to as a "window"), when a procedure is called with an allocation instruction. For at least one embodiment, the first 32 registers of a 128-register register file are static, and the remaining 96 registers implement a register stack to provide fresh registers when an allocation instruction is executed (which typically occurs after a call instruction). One commonly-recognized benefit of register windowing is reduced call/return overhead associated with saving and restoring register values that are defined before a subroutine call, and used after the subroutine call returns.

FIG. 2 illustrates that the processor 101a may also include a register stack engine (RSE) 122. The RSE 122 works in conjunction with the architectural renamer 118 to save and restore the contents of physical registers to memory when needed.

FIG. 2 further illustrates that the processor 101a may also include a micro-op queue 173. The micro-op queue 173 holds micro-ops 172a-172n that have been generated by the μ-op generator 116 until such micro-ops are forwarded to the OOO rename unit 106.

Figure 3:
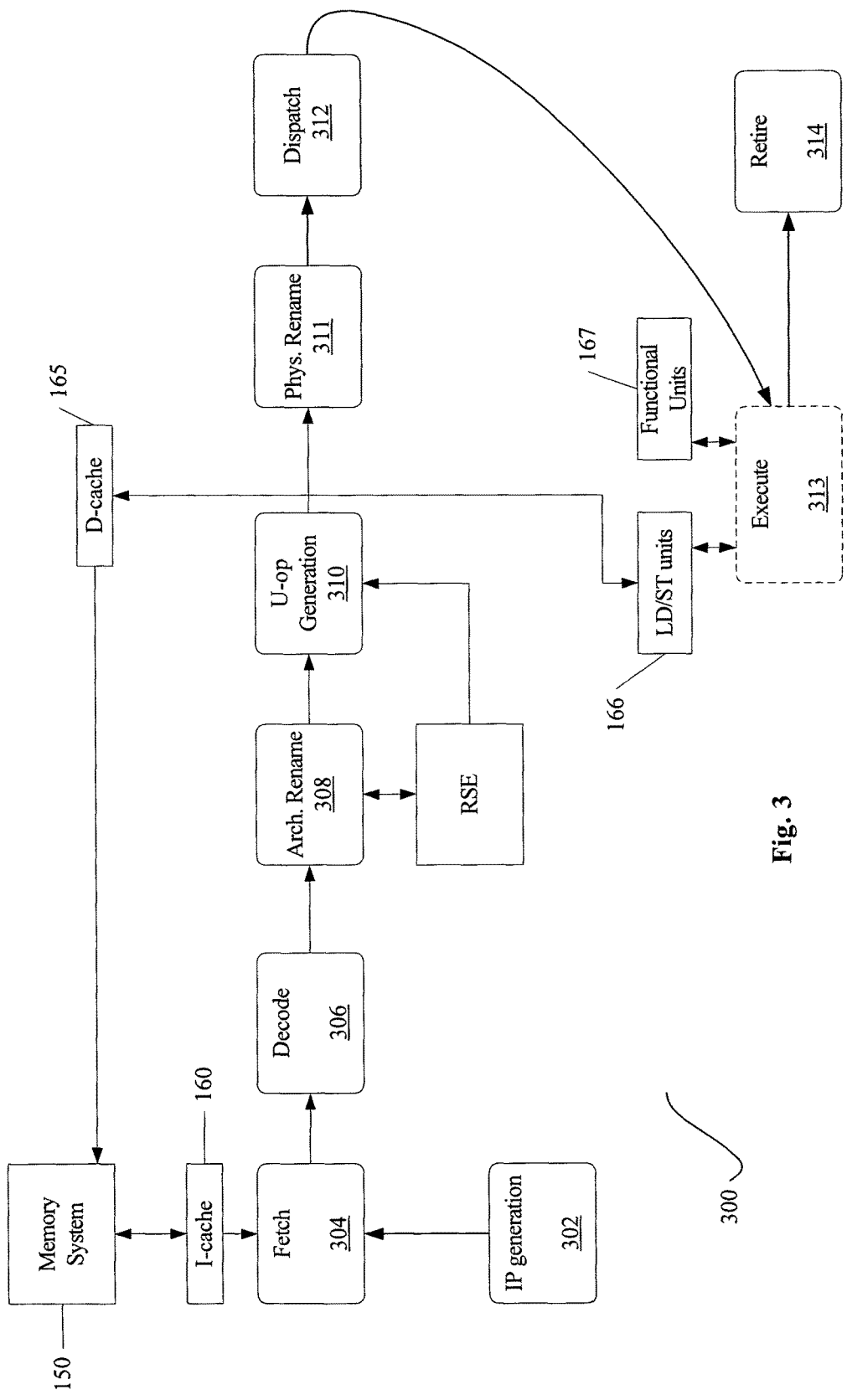
FIG. 3 is a flow diagram illustrating at least one embodiment of a generalized execution pipeline for an out-of-order processor.

Brief reference to FIG. 3 illustrates an embodiment of the execution pipeline 300 mentioned above. FIG. 3 illustrates that generating micro-ops during decomposition of an instruction may occur during a μ-op generation phase 310 of an execution pipeline 300. The illustrative pipeline 300 illustrated in FIG. 3 includes the following stages: instruction pointer generation 302, instruction fetch 304, instruction decode 306, architectural register rename 308, μ-op generation 310, physical register rename 311, dispatch 312, execution 313, and instruction retirement 314. The pipeline 300 illustrated in FIG. 3 is illustrative only; the techniques described herein may be used on any processor. For an embodiment in which the processor utilizes an execution pipeline 300, the stages of a pipeline 300 may appear in different order than that depicted in FIG. 3.

The techniques disclosed herein may be utilized on a processor whose pipeline 300 may include different or additional pipeline stages to those illustrated in FIG. 3. For example, alternative embodiments of the pipeline 300 may include additional pipeline stages for rotation, expansion, exception detection, etc. In addition, a VLIW-type (very long instruction word) processor may include different pipeline stages, such as a word-line decode stage, than appear in the pipeline for a processor that includes variable-length instructions in its instruction set.

Leaving FIG. 3, we turn now to a further discussion of predication-support micro-ops. One of the interesting issues to be dealt with when performing predicated instructions in an out-of-order processor arises from the fact that predicated instructions may indicate more than two source operands. Assume, for example, that a processor provides 64 predicate registers and that "(qp)" indicates that the predicate register that provides the qualifying predicate value for a given instruction. Consider the following example code sequence generated by a compiler:

a. add r1=r3, r4
b. (qp) add r1=r2, r3.

The first instruction, instruction a, is an unconditional instruction that generates a result value in destination register r1. The result value generated for register r1 by instruction a is referred to herein as the "first" value of r1. Keep in mind that, for a processor that utilizes OOO renaming in order to dynamically increase ILP, the "first" value of r1 may reside in a physical rename register as indicated by the rename map table 102 (FIG. 2).

The second instruction, instruction b, is a predicated instruction indicating a single destination register, r1. If the predicate value in qp is true, the add operation indicated by instruction b is to be performed. In such case, a "second" result value of r1 is generated. (Again, the value may actually reside in a physical rename register such one of the physical register 104s illustrated in FIG. 2). However, if the predicate value in qp is false, then the add operation indicated by instruction b will not be performed. In such case, the value of r1 after execution of statement b, when qp is false, is the "first" value of r1. Essentially, then, instruction b is a select operation.

Figure 4:
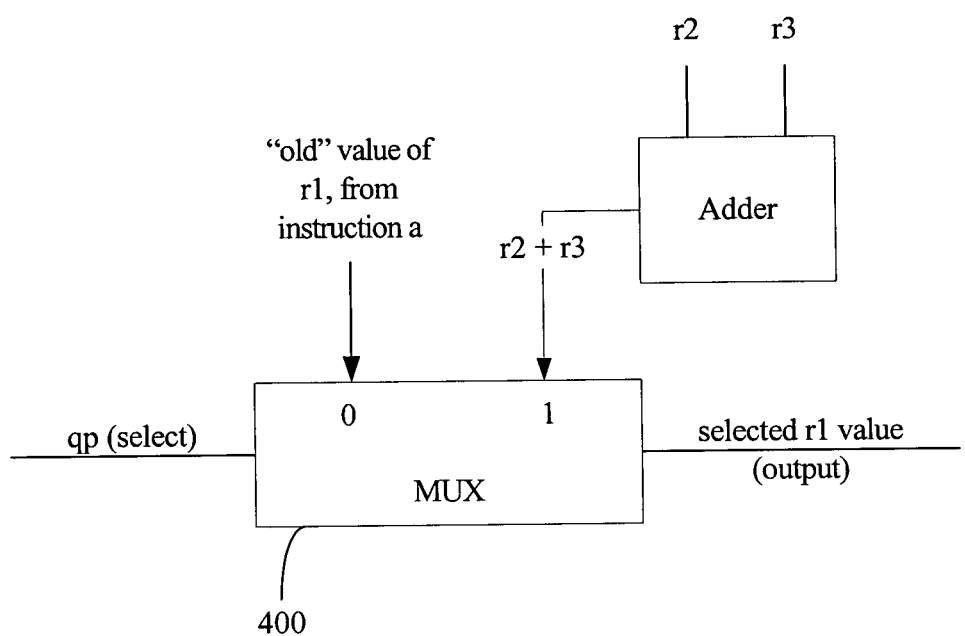
FIG. 4 is a block diagram illustrating at least one embodiment of hardware to select between old and new values for a register during execution of a multiple-destination predicated instruction.

FIG. 4 illustrates that sample instruction b effectively takes four sources to determine the value of r1: the "first" value of r1, qp, r2 and r3. The determination of the value of r1 is basically a mux function, with the predicate value being the selection input for the mux 400. FIG. 4 illustrates that the hardware to implement such a selection function is relatively complex, requiring four inputs and chaining together of all producers for the potential r1 value. In addition, having more than two source operands for the instruction also leads to increased complexity for the OOO rename unit 106 (FIGS. 1, 2) and the register file.

Figure 5:
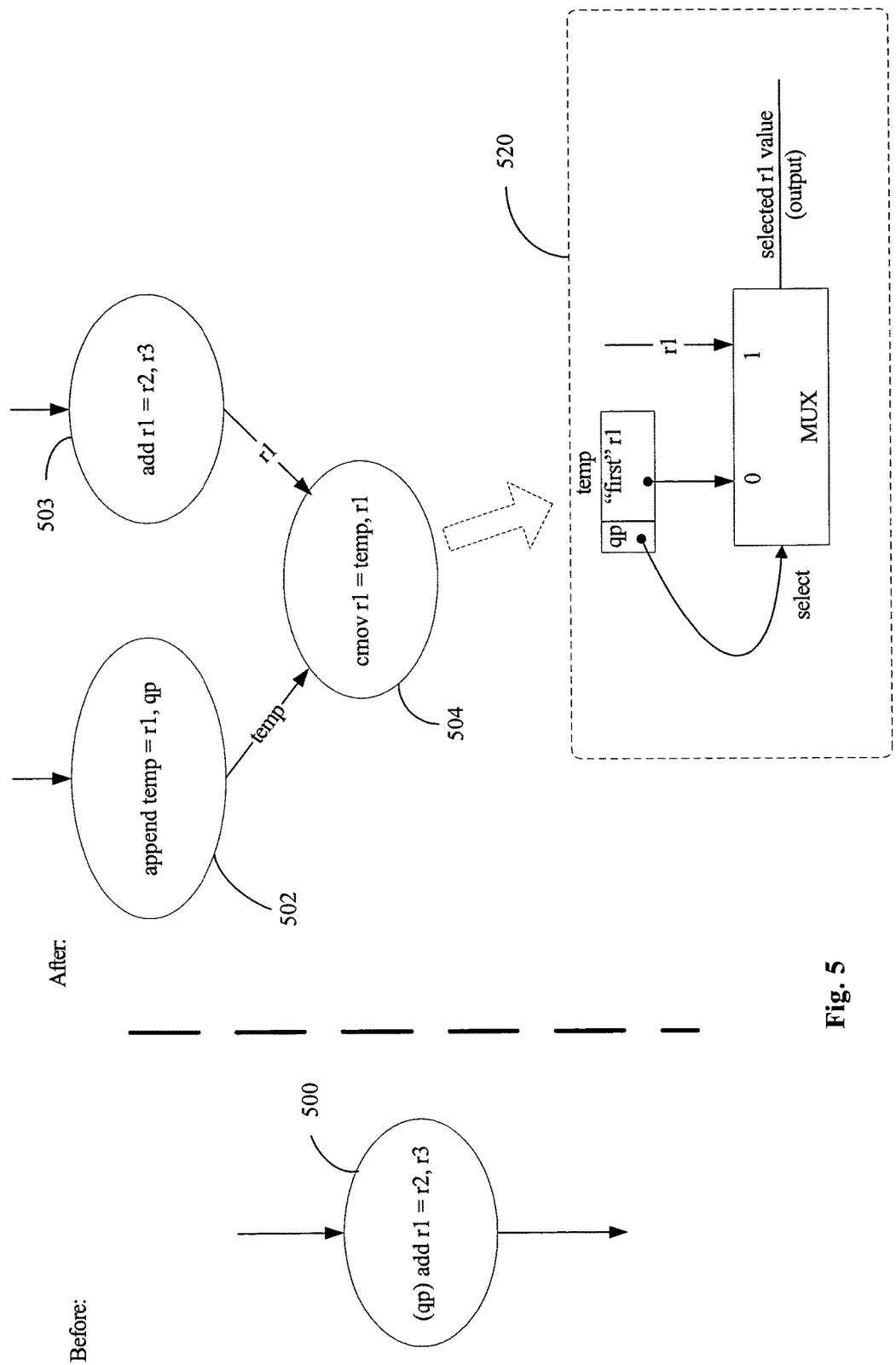
FIG. 5 is a block diagram illustrating at least one embodiment of three one-destination micro-ops to implement a sample multiple-destination predicated instruction.

FIG. 5 illustrates that, in order to simplify the hardware that executes a predicated instruction having more than two source operands, a sequence of three micro-operations 502, 503, 504 may be generated for instruction b (500). The following sequence of micro-operations may be produced by the μ-op generator 116 (FIGS. 1, 2) for sample instruction b set forth above. That is, predicated instruction b may be decomposed by μ-op generator 116 into the following multiple micro-ops, where each micro-op has only two sources and only one destination:

502. append temp=r1, qp
503. add r1=r2, r3
504. cmov r1=temp, r1

Micro-op 502, the append operation, is a predication-support micro-op that copies the "first" value of r1, plus the predicate value in qp, into a non-architected internal temporary rename register (such as one of the physical rename registers 104 illustrated in FIG. 2). Note that this approach results, for at least one embodiment, in the addition of an extra bit to the data associated with the temp register. For at least one embodiment, the integer register file thus accommodates 64 bits of integer data in addition to a $65^{th}$ bit for the predicate bit associated with the temp register. (For at least one embodiment, the register file may also include one or more additional bits, such as Not-a-Thing bit to support deferred exception processing, associated with the temp register).

Micro-op 503, the add operation, is essentially a normal non-predicated add micro-op. It indicates only one destination register and, at most, two source registers. This type of instruction is referred to herein as a "standard" micro-op. A standard micro-op addresses the basic operation indicated by the instruction 120 (such as instructions 15 set forth in Table 1), without consideration of predication.

Micro-op 504, the conditional move operation, is a predication-support micro-op that effects a selection between "first" and "second" values of r1. The conditional move ("cmov") micro-op 504 uses the extra bit appended to temp, which represents the qp value for the original predicated instruction 500, to select between the data value of temp (the original, or "first," value for r1 and the new, or "second," value of r1 computed by the add instruction 503. If the appended bit is true, then the predicate register for the original instruction 500 indicated a "true" value. In such case, the new "second" value of r1 is copied over itself into r1. If, however, the appended bit is false, then the predicate register for the original instruction 500 indicated a "false" value. In such case, the original "first" value of r1 is moved from temp back into r1.

FIG. 5 illustrates that the hardware 520 to execute the cmov instruction 504 is much simpler than the hardware 400 for execution of instruction b (500) that is illustrated in FIG. 4. After decomposition, simplified execution hardware 520 for the cmov instruction 504 only receives two inputs: temp and r1.

For an embodiment of processor 102a capable of executing predicated instructions having two destinations, the process of decomposing such predicated instructions into multiple micro-operations may be even more complicated than the example illustrated in FIG. 5. For instance, extra predication-support append and cmov micro-ops may be generated for each destination register indicated by a multiple-destination instruction. For purposes of illustration, Table 1 sets forth micro-ops that may be generated for the example illustrated in FIG. 3 and also for multiple-destination predicated instructions. For at least one embodiment, μ-op generator 116 (FIG. 1) generates the indicated micro-ops during a micro-op generation stage 310 of an execution pipeline 300 (FIG. 3). One of skill in the art will recognize that the instruction forms set forth in Table 1 are illustrative only, and are not intended to be an exhaustive list. Nor it is intended that the sample syntax for instructions and micro-ops set forth in Table 1 be taken to be limiting.

TABLE 1

| | Instructions | Micro-op Sequences |
|---|---|---|
| 1. | (qp) add r1 = r2, r3 | 1a append temp = r1, qp |
| | | 1b add r1 = r2, r3 |
| | | 1c cmov r1 = temp, r1 |
| 2. | (qp) ld4 r1 = [r3], r2 | 2a append temp1 = r1, qp |
| | | 2b append temp2 = r3, qp |
| | | 2c ld4 r1 = [r3] |
| | | 2d add r3 = r3, r2 |
| | | 2e cmov r1 = temp, r1 |
| | | 2f cmov r3 = temp2, r3 |
| 3. | (qp) cmp.eq p1, p2 = r2, r3 | 3a append p-temp1 = p1, qp |
| | | 3b append p-temp2 = p2, qp |
| | | 3c cmp.eq p1 = r2, r3 |
| | | 3d cmp.ne p2 = r2, r3 |
| | | 3e cmov p1 = p-temp1, p1 |
| | | 3f cmov p2 = p-temp2, p2 |
| 4. | (qp) cmp.eq.unc p1, p2 = r2, r3 | 4a cmp.eq p1 = r2, r3 |
| | | 4b cmp.ne p2 = r2, r3 |
| | | 4c cmov.unc p1 = qp, p1 |
| | | 4d cmov.unc. p2 = qp, p2 |
| 5. | (qp) cmp.eq.or p1, p2 = r2, r3 (See Tables 2–11 for more information concerning parallel compare instructions) | 5a append p-temp1 = p1, qp |
| | | 5b append p-temp2 = p2, qp |
| | | 5c cmp.eq p1 = r2, r3 |
| | | 5d cmp.eq p2 = r2, r3 |
| | | 5e cmov.or p1 = p-temp1, p1 |
| | | 5f cmov.or p2 = p-temp2, p2 |

The first instruction listed in Table 1 is the predicated one-destination add example illustrated in FIG. 5. The second instruction listed in Table 1 is, for at least one embodiment, a load instruction of the "register base update" form supported by the instruction set architecture of the Itanium® and Itanium® 2 microprocessors. To execute the instruction, a four-byte value is read from memory starting at the address specified by the value in r3. The value, which may be zero-extended, is placed in r1. The value in r3 is added to the value in r2, and the result is then placed back in r3. In this manner, the base address used for the load is incremented by the value in r2 after the load operation has been performed.

Table 1 illustrates that, for at least one embodiment, the load register base update form of instruction is decomposed (by, for instance, a μ-op generator such as 116 illustrated in FIGS. 1 and 2) into six micro-operations, 2a-2f. In order to simplify instruction 2 into standard micro-ops that each include only one destination and two sources, a standard non-predicated load instruction (2c) is generated and a separate standard add instruction to increment the base address by the value in r2 is also generated (see 2d). These standard micro-ops, 2c and 2d, are generated regardless of whether the load register base update instruction is predicated.

In addition, because instruction 2 is predicated, Table 1 indicates that predication-support micro-ops 2a, 2b, 2e and 2f are generated. One append micro-op and one cmov micro-op is generated for each predicated destination operand (r1 and r3). Thus, predication-support append micro-op 2a and cmov micro-op 2e are generated for destination register r1. Predication-support append micro-op 2b and cmov micro-op 2f are generated for destination register r3. Each of the six decomposed micro-ops 2a-2f indicates a single destination register and two source operands.

Table 1 illustrates that micro-op 2e is a predication-support cmov micro-op that conditionally overwrites register r1 with the "first" value of r1 that was saved into temp1 as a result of micro-op 2a. That is, if the appended predicate bit value in temp1 indicates a "false" value, then the predicate for the original instruction (instruction 2) was a "false" value. In such case, the value of r1 computed as a result of micro-op 2c is overwritten with the "first" value of r1 saved in temp1 as a result of micro-op 2a. Similarly, if the appended predicate bit value in temp1 indicates a "true" value, then the value of r1 computed as a result of micro-op 2c is the desired value for r1. In such case, the value of r1 computed as a result of micro-op 2c is copied to itself as a result of micro-op 2e.

Similarly, micro-op 2f is a conditional move instruction for the second destination register, register r3. Micro-op 2f overwrites register r3 with the "first" value of r3 that was saved into temp2 as a result of micro-op 2b. If the appended predicate bit value in temp2 indicates a "false" value, then the predicate for the original instruction (instruction 2) was a "false" value. In such case, the value of r3 computed as a result of micro-op 2d is overwritten with the "first" value of r3 saved in temp2 as a result of micro-op 2b. Similarly, if the appended predicate bit value in temp2 indicates a "true" value, then the value of r3 computed as a result of micro-op 2d is the desired value for r3. In such case, the value of r3 computed as a result of micro-op 2d is copied to itself as a result of micro-op 2f.

One of skill in the art will recognize that the series of micro-ops 2a-2f set forth in Table 1 is only one suggested embodiment and should not be taken to be limiting. For example, an alternative series of micro-ops that may be generated for instruction 2 during decomposition of instruction 2 is set forth in Table 1a:

TABLE 1a

Alternative Load Micro-Op Sequence

| Instruction | | Micro-op Sequence |
|---|---|---|
| 1. (qp) ld r1 = [r3] | 6a | append temp3 = r3, qp |
| | 6b | ld temp1 = [temp3] |
| | 6c | cmov r1 = temp1, r1 |

Table 1a illustrates an alternative embodiment wherein the qualifying predicate is appended to the address used for the load operation rather than being appended to the incoming value of one of the destination registers indicated by the instruction. In other words, the append micro-op 6a indicates that the qp value is to be stored as an additional bit with the load address.

Similarly, Table 1b illustrates that similar alternative append processing may be employed during decomposition of store instructions:

TABLE 1b

Alternative Store Micro-Op Sequence

| Instruction | | Micro-op Sequence |
|---|---|---|
| 1. (qp) store [r3] = r2 | 7a | append temp3 = r3, qp |
| | 7b | store [temp3] = r2 |

The store micro-operation 7b is conditional. Operation of a processor executing the store micro-op 7b depends on the qp value. For at least one embodiment, the qp value appended to the store address determines whether the processor will perform store-to-load forwarding. Similarly, operation of a processor executing the store micro-op 7b, as well as the load micro-op 6b illustrated in Table 1b, depends on the qp value to determine whether to the processor should perform certain operations, such as cache miss and translation lookaside buffer miss processing.

The third predicated instruction indicated in Table 1 is a predicated "compare equal" instruction to determine whether the two register values are equal and to set multiple predicate register values accordingly. The instruction indicates two destinations, which are both predicate registers. If the two values in registers r2 and r3 are equal, then, during execution, the first destination (p1) is set to a "true" value while the second destination (p2) is set to a "false" value. Converse result values are generated during execution if the two register values (r2 and r3) are not equal to each other. One of skill in the art will recognize that instruction 3 is presented for illustrative purposes only and should not be taken to be limiting. For example, any other type of compare instruction is included within the scope of the present disclosure, including at least the following types of compare instructions: equal, not equal, greater than, less than, greater than or equal, less than or equal, etc.

Table 1 illustrates that the compare equal instruction is decomposed (by, for instance, a μ-op generator such as 116 illustrated in FIGS. 1 and 2) into six micro-operations, 3a-3f. A standard compare micro-op 3c is generated to set p1 to a "true" value if the values in r2 and r3 are equal. If the two values are not equal, execution of standard micro-op 3c will set the value of p1 to "false."

A second standard compare micro-op (3d) is also generated to set p2 to a "true" value if the values in r2 and r3 are not equal. If the two values are equal, execution of micro-op 3c will set the value of p2 to "false."

In addition, because instruction 3 is predicated, Table 1 indicates that predication-support micro-ops 3a, 3b, 3e and 3f are generated. One predication-support append instruction and one predication-support cmov instruction is generated for each predicated destination operand, p1 and p2. (The append micro-ops 3a and 3b that append a predicate value onto a predicate register effectively involve tracking a second bit along with the one-bit predicate value. The OOO renamer 116 supports this extra bit).

Thus, append instruction 3a and cmov instruction 3e are generated for destination predicate register p1 while append instruction 3b and cmov instruction 3f are generated for destination predicate register p2. Each of the six decomposed micro-ops 3a-3f indicates a single destination register and two source operands.

Table 1 illustrates that micro-op 3e is a predication-support cmov micro-op that conditionally overwrites predicate register p1 with the "first" value of p1 that was saved into p-temp1 as a result of micro-op 3a. That is, if the appended predicate bit value in p-temp1 indicates a "false" value, then the predicate for the original instruction (instruction 3) was a "false" value. In such case, the value of p1 computed as a result of micro-op 3c is overwritten with the "first" value of p1 saved in p-temp1 as a result of micro-op 3a. Similarly, if the appended predicate bit value in p-temp1 indicates a "true" value, then the value of p1 computed as a result of micro-op 3c is the desired value for p1. In such case, the value of p1 computed as a result of micro-op 3c is copied to itself as a result of micro-op 3e.

Similarly, micro-op 3f is a predication-support cmov micro-op for the second destination register, predicate register p2. Micro-op 3f overwrites predicate register p2 with the "first" value of p2 that was saved into p-temp2 as a result of micro-op 3b. If the appended predicate bit value in p-temp2 indicates a "false" value, then the predicate for the original instruction (instruction 3) was a "false" value. In such case, the value of p2 computed as a result of micro-op 3d is overwritten with the "first" value of p2 saved in p-temp2 as a result of micro-op 3b. Similarly, if the appended predicate bit value in p-temp2 indicates a "true" value, then the value of p2 computed as a result of micro-op 3d is the desired value for p2. In such case, the value of p2 computed as a result of micro-op 3d is copied to itself as a result of micro-op 3f.

The fourth predicated instruction in Table 1 is a predicated "unconditional compare instruction". As a result of executing an unconditional compare instruction, if the qp value for the instruction is "false", the values of the destination predicate registers are set to zero, rather than leaving the values unchanged. The instruction implements the following pseudo-code function for the first specified target predicate register: if (qp=true), then {destination register=compare result} else {destination register=0}. The instruction implements the following pseudo-code function for the second specified target predicate register: if (qp=true), then {destination register=(not)compare result} else {destination register=0}.

Upon a false qualifying predicate, the destination registers are set to zero rather than to the "first" values of the registers. For such operation, there is no need to save the "first" values of the predicate registers. Accordingly, Table 1 illustrates that predication-support append micro-ops for the destination registers are not generated for the unconditional compare instruction.

If the qp value for the unconditional compare instruction is "true", then the instruction operates as a normal compare instruction. The compare result is written to the first destination predicate register (p1 in the Table 1 example) while the complement of the compare result is written to the second destination predicate register (p2 in the Table 1 example).

Because predication-support append micro-ops are not generated for the destination registers of an unconditional compare instruction such as sample instruction 4 set forth in Table 1, a specialized form of the cmov micro-op is generated for the instruction (see micro-ops 4c and 4d in Table 1). Ordinarily, the cmov micro-ops 1c, 2e, 2f, 3e and 3f discussed above utilize an extra bit of the temporary variable to select the appropriate destination register output value from among two registers. Instead, the specialized predication-support cmov.unc micro-ops 4c and 4d generated for the unconditional compare instruction write a zero value to the destination register if the qp value is false.

Accordingly, Table 1 illustrates that the unconditional compare instruction is decomposed (by, for instance, a μ-op generator such as 116 illustrated in FIGS. 1 and 2) into only micro-operations, 4a-4d. Each of the four decomposed micro-ops 4a-4d indicates a single destination register and two source operands.

Standard micro-ops are generated for the basic operation of the unconditional compare instruction so that they each include only one destination and two sources. A standard compare micro-op (4a) is generated to set p1 to a "true" value if the values in r2 and r3 are equal. If the two values are not equal, execution of micro-op 4a will set the value of p1 to "false."

A second standard compare micro-op (4b) is also generated to set p2 to a "true" value if the values in r2 and r3 are not equal. If the two values are equal, execution of micro-op 4b will set the value of p2 to "false."

Table 1 illustrates that a specialized predication-support conditional move micro-op, cmov.unc is generated for each predicated destination operand, p1 and p2. Execution of the cmov.unc micro-ops, 4c and 4d, result in writing a data value of zero to the corresponding destination predicate register if the value of the qp operand is "false." Otherwise, if the value of the qp operand is "true," the value of the predicate register generated during execution of the unpredicated compare instruction (4a or 4b) is copied to itself.

For at least one embodiment, the μ-op generator 116 may utilize the cmov.unc micro-op illustrated at entries 4c and 4d of Table 1 in other unconditional update sequences. For example, the cmov.unc micro-op may be utilized in micro-op sequences generated for floating point reciprocal approximation and/or floating point reciprocal square root approximation.

Table 1 illustrates that predication-support micro-op 4c is a cmov.unc micro-op that conditionally overwrites predicate register p1 with a zero data value if the qp predicate bit value for the instruction (instruction 4) indicates a "false" value. If, on the other hand, the qp predicate bit value for instruction 4 indicates a "true" value, then the value of p1 that was computed as a result of micro-op 4a is the desired value for p1 as a result of execution of instruction 4. In such case, the value of p1 computed as a result of micro-op 4a is copied to itself as a result of execution of micro-op 4c.

Similarly, micro-op 4d is also a predication-support cmov.unc micro-op for the second destination register, predicate register p2. Micro-op 4d conditionally overwrites predicate register p2 with a zero data value if the qp predicate bit value for the instruction (instruction 4) indicates a "false" value. If, on the other hand, the qp predicate bit value for instruction 4 indicates a "true" value, then the value of p2 that was computed as a result of micro-op 4b is the desired value for p2 as a result of execution of instruction 4. In such case, the value of p2 computed as a result of micro-op 4b is copied to itself as a result of execution of micro-op 4d.

The fifth predicated instruction in Table 1 is one example of a predicated "parallel compare" instruction. Parallel compare instructions perform a logical operation (such as "or" or "and" operation) during the same cycle as a compare operation. A parallel compare instruction may thus be of an "or" or "and" form. For at least one embodiment, additional forms of parallel compare instructions are also supported. For example, a parallel compare instruction my support a first logical operation for one predicate target and another logical operation for a second predicate target. The DeMorgan form is a combination of an "or" type compare for one of the destination predicate registers and an "and" type compare for the other destination predicate register. In addition, another form of parallel compare instruction may compare the contents of one source register with the complement of the contents of a second source register, and vice versa. Table 1 illustrates the "or" form of a predicated parallel compare instruction.

Parallel compare instructions allow multiple simultaneous compare operations (of the same type) to target a single destination predicate register. Both the qp value and the result of the specified compare operation (which may be, for example, cmp.ne, cmp.eq, etc.) determine whether the target predicate registers are updated. For an embodiment, such as that indicated in Table 2, below, where parallel compare instructions do not update the destination registers under certain conditions, it is assumed that the destination registers are properly initialized before the parallel compare instruction. For at least one embodiment, parallel compare instructions may implement the pseudo-code operations specified in Table 2.

TABLE 2

| Parallel Compare Type | | Operation | |
| --- | --- | --- | --- |
| | | First Predicate Destination | Second Predicate Destination |
| And | and | If (qp &&!result) then {target = 0} | If (qp &&!result) then {target = 0} |
| | andcm | If (qp && result) then {target = 0} | If (qp && result) then {target = 0} |
| Or | or | If (qp && result) then {target = 1} | If (qp && result) then {target = 1} |
| | orcm | If (qp &&!result) then {target = 1} | If (qp &&!result) then {target = 1} |
| DeMorgan | or.andcm | If (qp && result) then {target = 1} | If (qp && result) then {target = 0} |
| | and.orcm | If (qp &&!result) then {target = 0} | If (qp &&!result) then {target = 1} |

Understanding operation of the parallel compare instructions is useful when determining the standard micro-ops to be generated during decomposition by the μ-op generator 116 (FIGS. 1 and 2). In order to better understand the operation of the sample parallel compare operations indicated in Table 2, consider the truth tables set forth below in Tables 3-9.

Table 3 illustrates that, for parallel compare instructions, the values of destination registers p1 and p2 remain unchanged if the qualifying predicate (qp) for the parallel instruction is false:

TABLE 3

| All parallel compare instructions; qp = false | | | | | |
| --- | --- | --- | --- | --- | --- |
| qp for instruction | Rslt of compare | Incoming Value of 1$^{st}$ destination predicate register | Result value of 1$^{st}$ destination predicate register | Incoming Value of 2$^{nd}$ destination predicate register | Result value of 2$^{nd}$ destination predicate register |
| 0 | Don't care | x | x | y | y |

Tables 4-9 are truth tables for various illustrative forms of parallel compare instructions in the case that the qualifying predicate, qp, is true. Table 4, below, is a truth table for the parallel "and" instruction when the qualifying predicate is true. Table 4 illustrates that the initial value of the destination predicate registers for a parallel "and" instruction fall through unmodified if the result of the comparison designated for the instruction is true. For example, consider a sample parallel comp.eq.and instruction: cmp.eq.and p1, p2=r2, r3. Lines 3 and 4 of Table 4 illustrate that, if the contents of r2 and r3 are equal, then the initial values of p1 and p2 fall through as the result values. In other words, these are "do nothing" cases. However, lines 1 and 2 of Table 4 illustrate that the result values for the destination registers are forced to a zero (i.e., "false") value, regardless of the incoming value of the destination register, if the indicated comparison result is false.

TABLE 4

| Parallel compare "and" instruction; qp = true | | | |
| --- | --- | --- | --- |
| qp for instruction | Rslt of compare ("rslt") | Incoming Value of destination predicate register (p) | Result value of destination predicate register (rslt and p) |
| 1. | 1 | 0 | 0 | 0 |
| 2. | 1 | 0 | 1 | 0 |
| 3. | 1 | 1 | 0 | 0 |
| 4. | 1 | 1 | 1 | 1 |

Table 5 below, is a truth table for the parallel "or" instruction when the qualifying predicate is true. Table 5 illustrates that the initial value of the destination predicate registers for a parallel "or" instruction fall through unmodified if the result of the comparison designated for the instruction is false. For example, consider a sample parallel comp.eq.or instruction: cmp.eq.or p1, p2=r2, r3. Lines 1 and 2 of Table 5 illustrate that, if the contents of r2 and r3 are not equal, then the initial values of p1 and p2 fall through as the result values. In other words, these are "do nothing" cases. However, lines 3 and 4 of Table 5 illustrate the result values for the destination registers are forced to a true value, regardless of the incoming value of the destination register, if the indicated comparison result is true. That is, each destination predicate register p1 and p2 is assigned a "true" value if the contents of source registers r2 and r3 are equal.

TABLE 5

| Parallel compare "or" instruction; qp = true | | | |
| --- | --- | --- | --- |
| qp for instruction | Rslt of compare ("rslt") | Incoming Value of destination predicate register (p) | Result value of destination predicate register (rslt or p) |
| 1. | 1 | 0 | 0 | 0 |
| 2. | 1 | 0 | 1 | 1 |
| 3. | 1 | 1 | 0 | 1 |
| 4. | 1 | 1 | 1 | 1 |

Table 6, below, is a truth table for the parallel "andcm" instruction when the qualifying predicate is true. The "andcm" instruction performs an "and" operation on the complement of the result of the indicated comparison with the contents of the indicated destination predicate register. For example, the "andcm" instruction cmp.eq.andcm p1, p2=r2, r3 may be considered the functional equivalent of the corresponding "not equal" instruction: cmp.neq.and p1, p2=r2, r3.

Table 6 illustrates that the initial value of the destination predicate registers for a parallel "andcm" instruction fall through unmodified if the result of the comparison designated for the instruction is false. For example, consider a sample parallel comp.eq.andcm instruction: cmp.eq.andcm p1, p2=r2, r3. Lines 1 and 2 of Table 6 illustrate that, if the contents of r2 and r3 are not equal, then the initial values of p1 and p2 fall through as the result values. In other words, these are "do nothing" cases. However, lines 3 and 4 of Table 6 illustrate the result values for the destination registers are forced to a false value, regardless of the incoming value of the destination register, if the indicated comparison result is true. That is, each destination register p1 and p2 is assigned a "false" value if the contents of source registers r2 and r3 are equal.

TABLE 6

Parallel compare "andcm" instruction; qp = true

| | qp for instruction | Rslt of compare ("rslt") | !rslt | Incoming Value of destination predicate register (p) | Result value of destination predicate register (!rslt and p) |
|---|---|---|---|---|---|
| 1. | 1 | 0 | 1 | 0 | 0 |
| 2. | 1 | 0 | 1 | 1 | 1 |
| 3. | 1 | 1 | 0 | 0 | 0 |
| 4. | 1 | 1 | 0 | 1 | 0 |

Table 7, below, is a truth table for the parallel "orcm" instruction when the qualifying predicate is true. The "orcm" instruction performs an "or" operation on the complement of the result of the indicated comparison with the contents of the indicated destination predicate register. For example, the sample "orcm" instruction cmp.eq.orcm p1, p2=r2, r3 may be considered the functional equivalent of the corresponding "not equal" instruction: cmp.neq.or p1, p2=r2, r3.

Table 7 illustrates that the initial value of the destination predicate registers for a parallel "orcm" instruction fall through unmodified if the result of the comparison designated for the instruction is true. For example, consider a sample parallel comp.eq.orcm instruction: cmp.eq.orcm p1, p2=r2, r3. Lines 3 and 4 of Table 7 illustrate that, if the contents of r2 and r3 are equal, then the initial values of p1 and p2 fall through as the result values. In other words, these are "do nothing" cases. However, lines 1 and 2 of Table 7 illustrate the result values for the destination registers are forced to a "true" value, regardless of the incoming value of the destination register, if the indicated comparison result is false. That is, each of the destination predicate registers p1 and p2 is assigned a "true" value if the contents of source registers r2 and r3 are not equal.

TABLE 7

Parallel compare "orcm" instruction; qp = true

| | qp for instruction | Rslt of compare ("rslt") | !rslt | Incoming Value of destination predicate register (p) | Result value of destination predicate register (!rslt or p) |
|---|---|---|---|---|---|
| 1. | 1 | 0 | 1 | 0 | 1 |
| 2. | 1 | 0 | 1 | 1 | 1 |
| 3. | 1 | 1 | 0 | 0 | 0 |
| 4. | 1 | 1 | 0 | 1 | 1 |

Table 8, below, is a truth table for the DeMorgan parallel "or.andcm" instruction when the qualifying predicate is true. The "or.andcm" instruction may force different values for the destination predicate registers. For the first destination predicate register, the "or.andcm" parallel compare instruction performs an "or" operation on the result of the indicated comparison with the contents of the first indicated destination predicate register. For the second destination predicate register, the "or.andcm" parallel compare instruction performs an "and" operation on the complement of the result of the indicated comparison with the contents of the second indicated destination predicate register.

Table 8 illustrates that the initial values of the first and second destination predicate registers for a "or.andcm" parallel compare instruction fall through unmodified if the result of the comparison designated for the instruction is false. For example, consider a sample parallel comp.eq.or.andcm instruction: cmp.eq.or.andcm p1, p2=r2, r3. Lines 1-4 of Table 8 illustrate that, if the contents of r2 and r3 are equal, then the initial values of p1 and p2 fall through as the result values. In other words, these are "do nothing" cases. However, lines 5-8 of Table 8 illustrate the result value for the first predicate destination register is forced to a "true" value, regardless of the incoming value of the destination register, if the indicated comparison result is false. Lines 5-8 of Table 8 also illustrate the result value for the second predicate destination register is forced to a "false" value, regardless of the incoming value of the destination register, if the indicated comparison result is false. That is, if the contents of source destination registers r2 and r3 are equal, then destination register p1 is set to a "true" value and destination register p2 is reset to a "false" value.

TABLE 8

Parallel compare "or.andcm" instruction; qp = true

| | qp for instruction | Rslt of compare ("rslt") | !rslt | Incoming Value of first destination predicate register (p1) | Incoming Value of 2nd destination predicate register (p2) | Result value of first destination predicate register (rslt or p1) | Result value of 2nd destination predicate register (!rslt and p2) |
|---|---|---|---|---|---|---|---|
| 1. | 1 | 0 | 1 | 0 | 0 | 0 | 0 |
| 2. | 1 | 0 | 1 | 0 | 1 | 0 | 1 |
| 3. | 1 | 0 | 1 | 1 | 0 | 1 | 0 |
| 4. | 1 | 0 | 1 | 1 | 1 | 1 | 1 |
| 5. | 1 | 1 | 0 | 0 | 0 | 1 | 0 |

TABLE 8-continued

Parallel compare "or.andcm" instruction; qp = true

| | qp for instruction | Rslt of compare ("rslt") | !rslt | Incoming Value of first destination predicate register (p1) | Incoming Value of 2nd destination predicate register (p2) | Result value of first destination predicate register (rslt or p1) | Result value of 2nd destination predicate register (!rslt and p2) |
|---|---|---|---|---|---|---|---|
| 6. | 1 | 1 | 0 | 0 | 1 | 1 | 0 |
| 7. | 1 | 1 | 0 | 1 | 0 | 1 | 0 |
| 8. | 1 | 1 | 0 | 1 | 1 | 1 | 0 |

Table 9, below, is a truth table for the DeMorgan "and.orcm" parallel compare instruction when the qualifying predicate is true. The "and.orcm" instruction may force different values for the destination predicate registers. For the first destination predicate register, the "and.orcm" parallel compare instruction performs an "and" operation on the result of the indicated comparison with the contents of the first indicated destination predicate register. For the second destination predicate register, the "and.orcm" parallel compare instruction performs an "or" operation on the complement of the result of the indicated comparison with the contents of the second indicated destination predicate register.

Table 9 illustrates that the initial values of the first and second destination predicate registers for an "and.orcm" parallel compare instruction fall through unmodified if the result of the comparison designated for the instruction is true. For example, consider a sample parallel comp.eq.and.orcm instruction: cmp.eq.and.orcm p1, p2=r2, r3. Lines 5-8 of Table 9 illustrate that, if the contents of r2 and r3 are equal, then the initial values of p1 and p2 fall through as the result values. In other words, these are "do nothing" cases. However, lines 1-4 of Table 9 illustrate the result value for the first predicate destination register is forced to a "false" value, regardless of the incoming value of the destination register, if the indicated comparison result is false. Lines 1-4 of Table 9 also illustrate that the result value for the second predicate destination register is forced to a "true" value, regardless of the incoming value of the second destination register, if the indicated comparison result is false. That is, if the contents of source destination registers r2 and r3 are not equal, then destination register p1 is set to a "false" value and destination register p2 is reset to a "true" value

TABLE 9

Parallel compare "and.orcm" instruction; qp = true

| | qp for instruction | Rslt of compare ("rslt") | !rslt | Incoming Value of first destination predicate register (p1) | Incoming Value of 2nd destination predicate register (p2) | Result value of first destination predicate register (rslt and p1) | Result value of 2nd destination predicate register (!rslt or p2) |
|---|---|---|---|---|---|---|---|
| 1. | 1 | 0 | 1 | 0 | 0 | 0 | 1 |
| 2. | 1 | 0 | 1 | 0 | 1 | 0 | 1 |
| 3. | 1 | 0 | 1 | 1 | 0 | 0 | 1 |
| 4. | 1 | 0 | 1 | 1 | 1 | 0 | 1 |
| 5. | 1 | 1 | 0 | 0 | 0 | 0 | 0 |
| 6. | 1 | 1 | 0 | 0 | 1 | 0 | 1 |
| 7. | 1 | 1 | 0 | 1 | 0 | 1 | 0 |
| 8. | 1 | 1 | 0 | 1 | 1 | 1 | 1 |

The "or" form of the parallel compare instruction set forth at instruction 5 of Table 1 is more complex than the unconditional compare set forth at instruction 4 of Table 1. That is, six micro-ops 5a-5f, instead of four, are generated for the predicated parallel compare instruction. While the following discussion focuses, for purposes of illustration, on the sample "or" form of a parallel compare instruction set forth at instruction 5 of Table 1, one skilled in the art will understand that the embodiments discussed herein of a method of decomposing an instruction into micro-ops is intended to encompass all forms of parallel compare instructions.

For at least one embodiment, the six micro-ops 5a-5f are generated, for at least one embodiment, by the μ-op generator 116 (FIG. 1). Each of the six decomposed micro-ops 5a-5f indicates a single destination register and two source operands. The decomposed micro-ops 5a-5f are intended to simplify the execution hardware involved in executing instruction 5.

Figure 8:
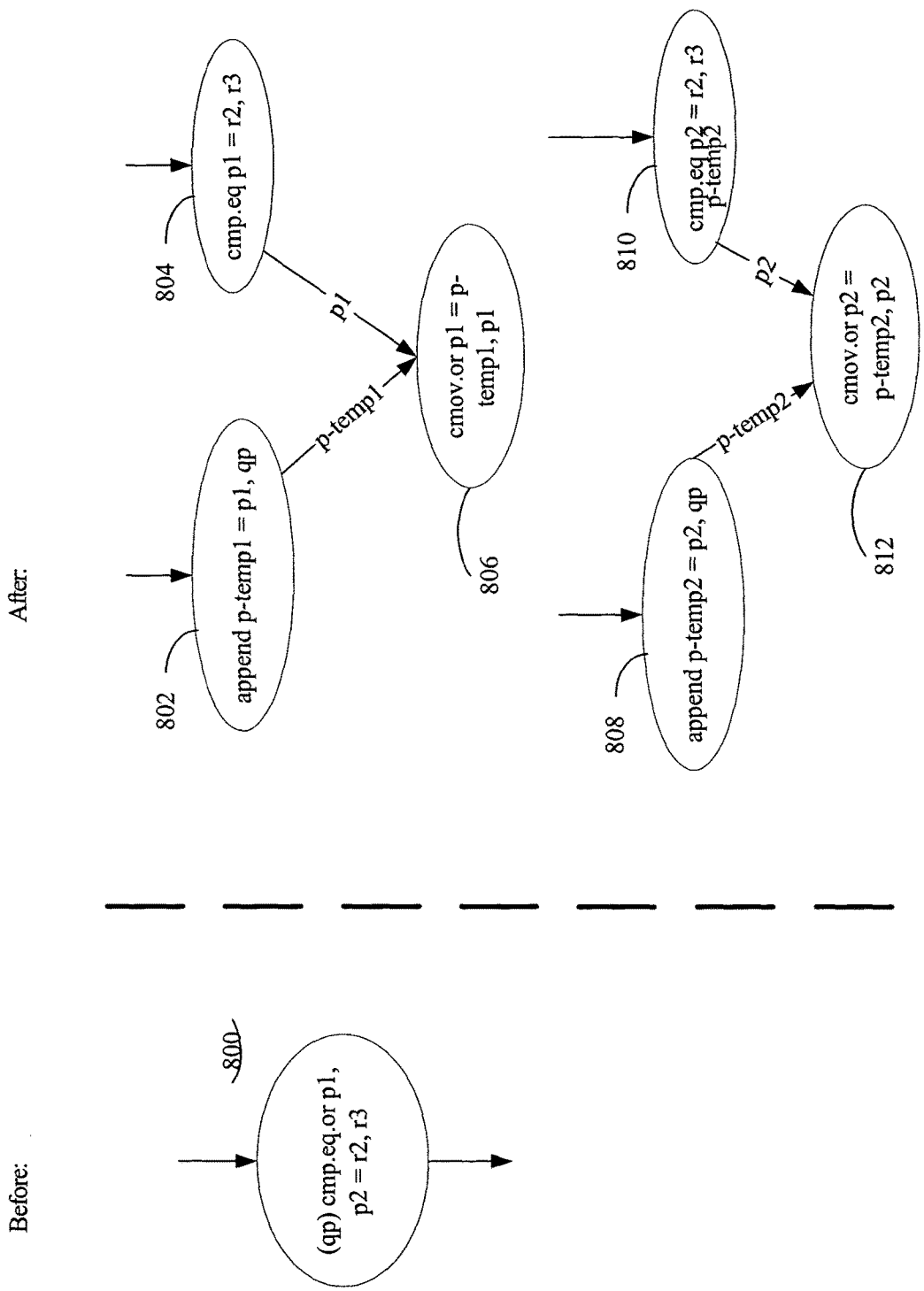
FIG. 8 is block diagram illustrating decomposition of an "or" form parallel compare instruction.
Figure 9:
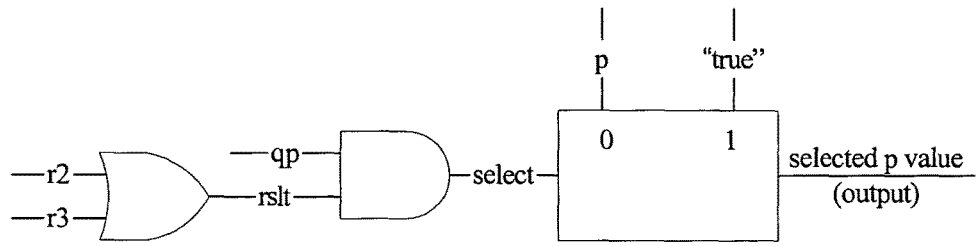
FIG. 9 is a block diagram illustrating a first selection circuit for execution of a parallel compare instruction and illustrative a simplified selection circuit for execution of a decomposed conditional move micro-operation.
Figure 9:
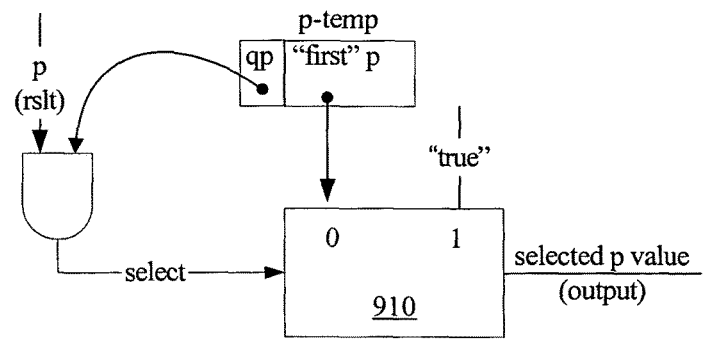

Brief reference to FIGS. 8 and 9 illustrates that, as is shown in Table 1, in order to simplify the hardware that executes a predicated parallel compare, a sequence of six micro-operations 802, 804, 806, 808, 810, 812 may be generated for instruction 5 (800).

For at least one embodiment, a hardware structures 902 implements the truth table set forth in Table 5. FIG. 9 illustrates that the hardware 902 for execution of the original predicated parallel compare instruction 800 is relatively complex. It receives four inputs: qp, r2, r3 and the p value.

One of skill in the art will understand that each p value p1, p2 is run through the hardware 902. For at least one embodiment, each p value is run concurrently through one of multiple hardware structures 902 along the lines illustrated in FIG. 9. One of skill in the art will recognize that alternative structure arrangements may be employed in order to achieve the functionality illustrated in Table 5. All such alternative structures are within the scope of the current disclosure.

FIG. 8 illustrates that following sequence of micro-operations may be produced by the μ-op generator 116 (FIGS. 1, 2) for sample instruction 5 set forth above in Table 1. That is, predicated instruction 5 may be decomposed by μ-op generator 116 into the following multiple micro-ops, where each micro-op has only two sources and only one destination:

- 802. appendp-temp1=p1, qp
- 804. cmp.eq p1=r2, r3
- 806. cmov.or p1=p-temp 1, p1
- 808. appendp-temp2=p2, qp
- 810. cmp.eq p2=r2, r3
- 812. cmov.or p2=p-temp2, p2.

Referring also to Table 1, it is seen that "standard" non-predicated compare micro-ops 5c (806) and 5d (810) are generated for the basic functional operation indicated by the parallel compare instruction (see Table 5). Table 1 indicates that, for the sample "or" parallel compare instruction set forth at instruction 5, one standard compare micro-op is generated for each of the destination predicate registers indicated by the instruction (800).

One standard compare micro-op 5c (806) is generated to set p1 to a "true" value if the values in r2 and r3 are equal. If the two values are not equal, execution of standard micro-op 5c (806) sets the value of p1 to "false."

A second standard compare micro-op 5d (810) is also generated to set p2 to a "true" value if the values in r2 and r3 are equal. If the two values are not equal, execution of micro-op 5c (810) sets the value of p2 to "false."

In addition, because instruction 5 is predicated, Table 1 and FIG. 8 indicate that predication-support micro-ops 5a (802), 5b (808), 5e (806) and 5f (812) are generated. One predication-support append instruction and one predication-support cmov instruction is thus generated for each predicated destination operand, p1 and p2.

Micro-op 5a (802), the append operation for p1, is a predication-support micro-op that copies the "first" value of p1, plus the predicate value in qp, into a non-architected internal temporary register, "p-temp".

Micro-op 5b (808), the append operation for p2, is a also predication-support micro-op. Micro-op 5b copies the "first" value of p2, plus the predicate value in qp, into a non-architected internal temporary register, "p-temp2".

Note that this approach of appending the qp to a predicate register value results, for at least one embodiment, in the addition of an extra bit to the data value associated with the predicate register. For at least one embodiment, the predicate register file thus accommodates 1 bit of data for the predicate register and also an additional $2^{nd}$ bit for the qualifying predicate.

Micro-ops 5e and 5f, the conditional move operations 806 and 812, respectively, are predication-support micro-ops that effects a selection. FIGS. 8 and 9 illustrate that inputs for the cmov.or micro-op are the p-temp1 value generated as a result of the append micro-op 5a (802) and the p1 value generated as a result of the compare micro-op 5c (804). Accordingly, hardware structure 904 to execute the cmov micro-ops 5e (806) and 5f (812) is less complicated than structure 902.

The operation of the cmov.or micro-op is as follows. If the qp value appended and stored as an extra bit in the temporary predicate register (p-temp1 and p-temp2) is true, then the qualifying predicate for instruction 5 was true. If not, then the selection line for the mux 910 is false, and the value of "first" value of the predicate register falls through from the temporary predicate register as the destination value.

However, if the qp value in the temporary predicate register is true, then the value on the selection line of the mux depends on the "second" value of the predicate register. This "second" value reflects the result of the compare operation performed as a result of the corresponding compare micro-op—5c (804) for p1 and 5d (810) for p1.

Table 5, along with FIG. 9, reflects the operation of the mux 910 when the qp value in the temporary predicate register indicates a "true" value. Lines 1 and 2 indicate that, if the result of the compare operation, as reflected in the "second" value of the predicate register, is false, then the selection line goes low and the "first" value of the predicate register falls through from the temporary predicate register as the destination value.

In contrast, lines 3 and 4 of Table 5, along with FIG. 9, reflects that if the result of the compare operation, as reflected in the "second" value of the predicate register, is true, then the selection line goes high. In such case, a constant value of "true" (such as for instance, a value of 1b'1') is selected as the destination value.

FIG. 9 thus illustrates that, prior to decomposition, selection circuit 902 to execute instruction 5 (800, FIG. 8) is relatively complex, requiring four inputs. In contrast, selection circuit 904 to execute the cmov.or micro-ops (806 and 812, FIG. 8) is simpler, receiving only two inputs.

One of skill in the art will recognize, as is stated above, that similar decomposition may be performed for any other parallel compare instructions. The "or" parallel compare instruction illustrated in FIGS. 8 and 9 is provided for illustrative purposes and should not be taken to be limiting.

Figure 10:
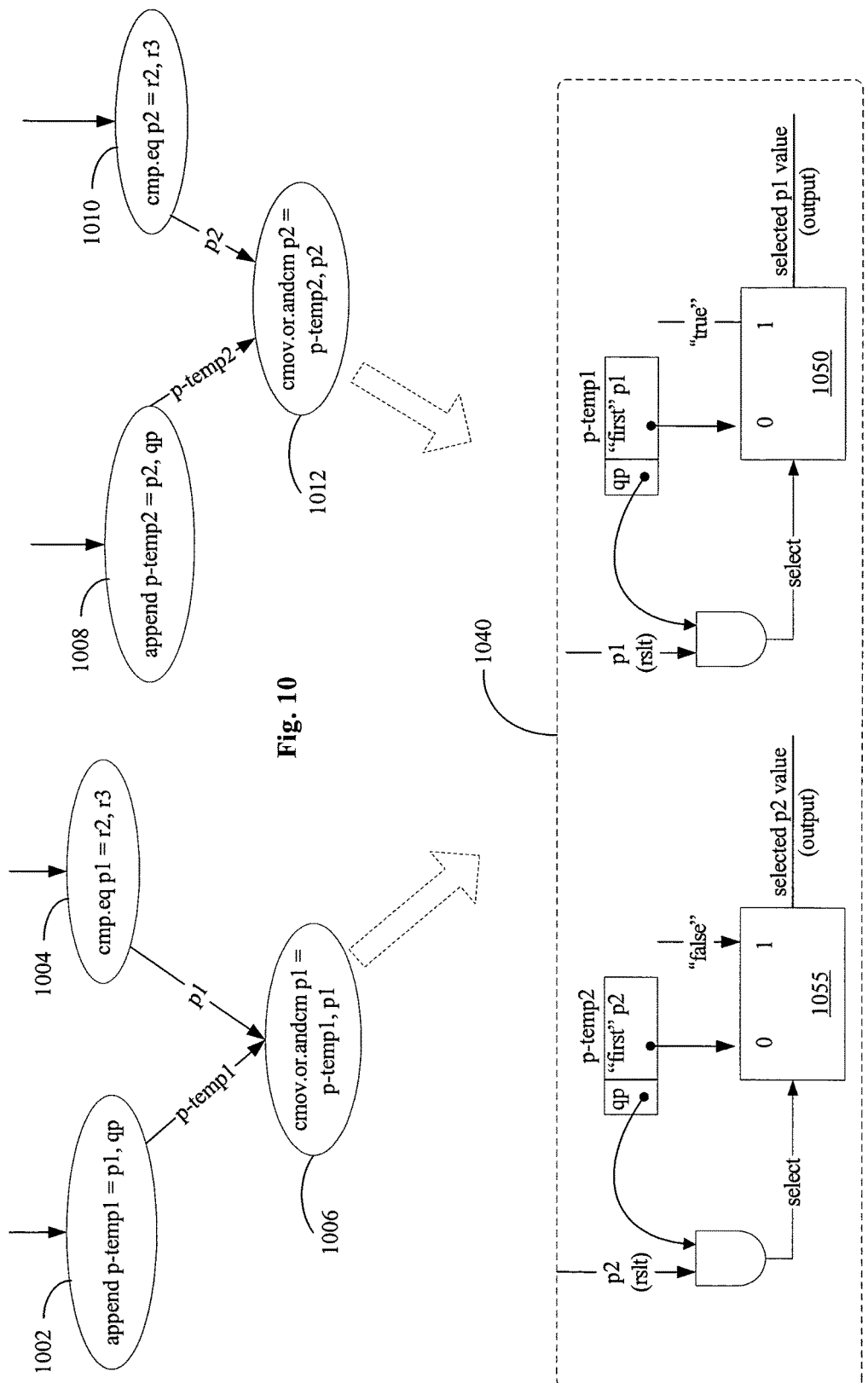
FIG. 10 is a block diagram illustrating decomposed micro-operations and selection circuit for an "or.andcm" form of parallel compare instruction.

For example, the illustrative selection circuit 1040 illustrated in FIG. 10 may be utilized to execute the cmov.or.andcm micro-ops 10a-10f (1002-1012) set forth in Table 10, below. Table 10 illustrates decomposition of an "or.andcm" form of DeMorgan parallel compare instruction into micro-ops 10a-10f. Operation of selection circuit 1060, which includes muxes 1050 and 1055, implements the functionality indicated by the truth table set forth in Table 8.

TABLE 10

| DeMorgan Instruction | | |
|---|---|---|
| Instruction | | Micro-op Sequences |
| (qp) cmp.eq.or.andcm p1, p2 = r2, r3 | 10a | append p-temp1 = p1, qp |
| | 10b | append p-temp2 = p2, qp |
| | 10c | cmp.eq p1 = r2, r3 |
| | 10d | cmp.eq p2 = r2, r3 |
| | 10e | cmov.or.andcm p1 = p-temp1, p1 |
| | 10f | cmov.or.andcm p2 = p-temp2, p2 |

Figure 11:
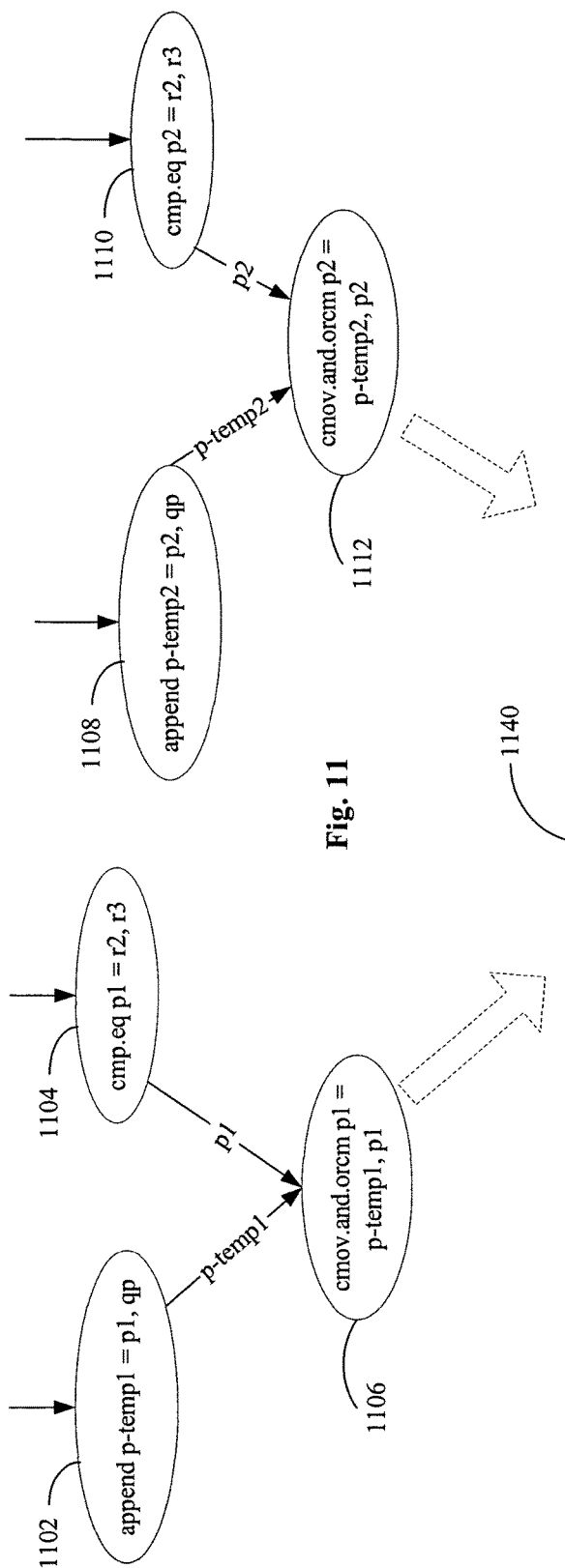
FIG. 11 is a block diagram illustrating decomposed micro-operations and selection circuit for an "and.orcm" form of parallel compare instruction.
Figure 11:
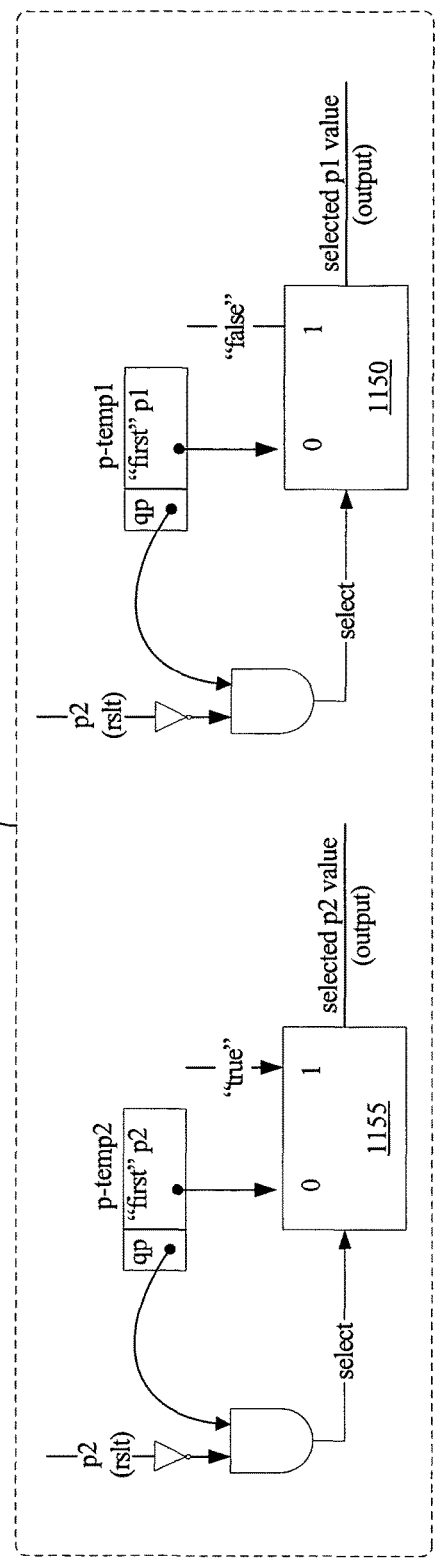

Similarly, the illustrative selection circuit 1140 illustrated in FIG. 11 may be utilized to execute the cmov.and.orcm micro-ops 11a-11f (1102-1112) set forth in Table 11, below.

Table 11 illustrates decomposition of an "and.orcm" form of DeMorgan parallel compare instruction into micro-ops 11a-11f. Operation of selection circuit 1160, which includes muxes 1150 and 1155, implements the functionality indicated by the truth table set forth in Table 9.

TABLE 11

DeMorgan Instruction

| Instruction | | Micro-op Sequences |
|---|---|---|
| (qp) cmp.eq.and.orcm p1, p2 = r2, r3 | 5a | append p-temp1 = p1, qp |
| | 5b | append p-temp2 = p2, qp |
| | 5c | cmp.eq p1 = r2, r3 |
| | 5d | cmp.eq p2 = r2, r3 |
| | 5e | cmov.and.orcm p1 = p-temp1, p1 |
| | 5f | cmov.and.orcm p2 = p-temp2, p2 |

Similarly, one of skill in the art will also understand that selection circuits may also be built to perform the functionality shown in the truth tables set forth in Tables 4, 6 and 7, above.

Figure 6:
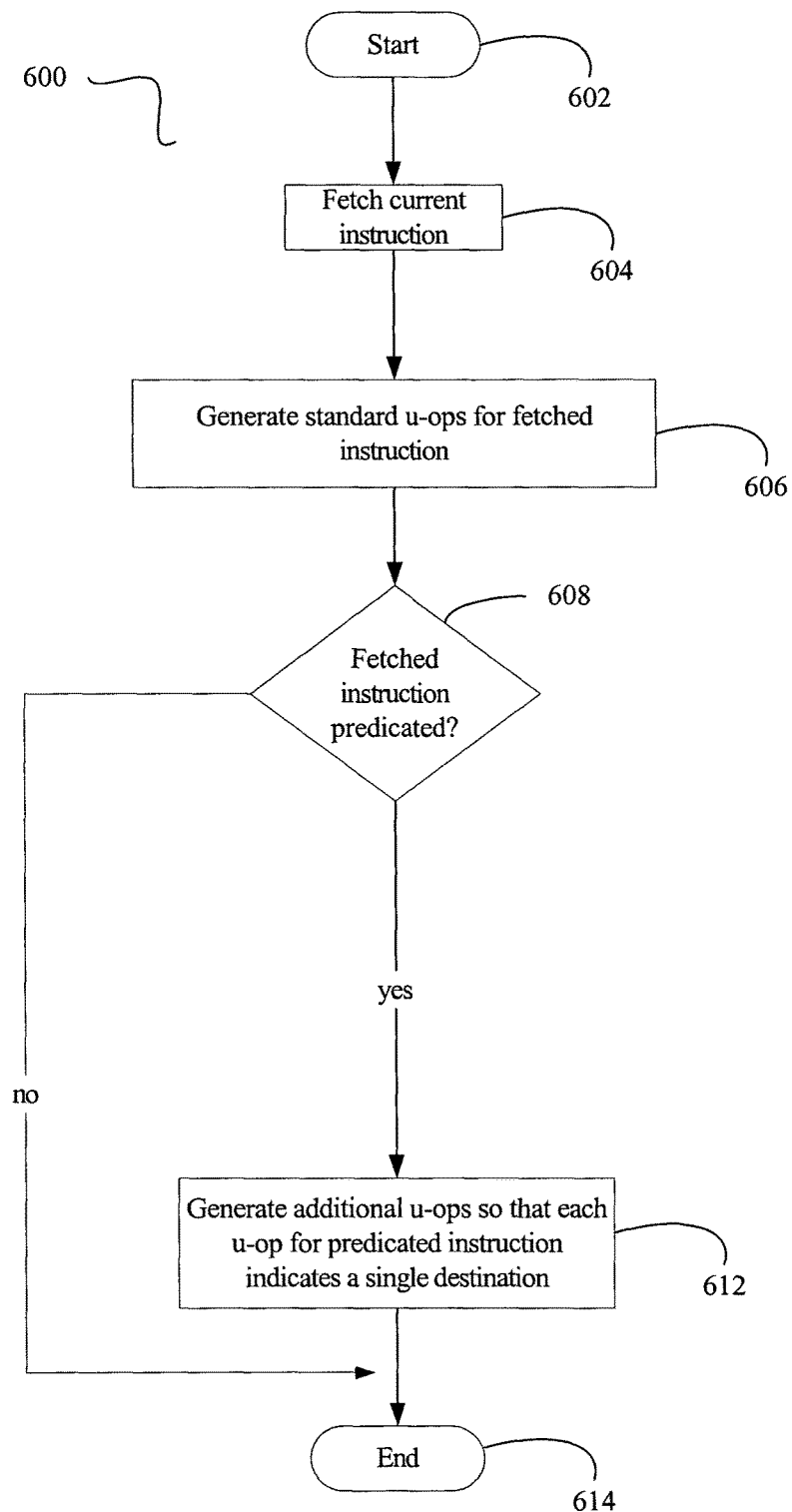
FIG. 6 is a flowchart illustrating at least one method for generating single-destination micro-ops for a predicated multi-destination instruction.

The approaches, discussed above, of decomposing various multiple-destination instructions into a series of micro-ops may be generalized. FIG. 6. FIG. 6 is a flowchart illustrating at least one embodiment of a method 600 for decomposing a predicated multiple-destination instruction into a series of single-destination micro-ops. For at least one embodiment, a µ-op generator 116 (FIG. 1) performs blocks 606-612 of the method 600 during a micro-op generation stage 310 of an execution pipeline 300 (FIG. 3). A fetch unit (not shown) may perform block 604 during a fetch stage 304 of an execution pipeline 300 (FIG. 3).

FIG. 6 illustrates that processing for the method 600 begins at block 602 and proceeds to block 604. At block 604 the current predicated instruction is fetched from an instruction cache such as instruction cache 160 illustrated in FIGS. 1 and 2. Responsive to a miss in the instruction cache, the instruction may be fetched from an instruction space in memory (such as, e.g., 150 in FIGS. 1 and 2), such as instruction space 140 illustrated in FIGS. 1 and 2.

The instruction fetched at block 604 may be either a single-destination instruction or a multiple-destination instruction. Accordingly, for at least one embodiment, the instruction fetched at block 604 is a multiple-destination instruction. Such multiple-destination instruction may be of those forms set forth at instructions 2 through 5 of Table 1. One skilled in the art will recognize, however, that instruction architectures may also support other multiple-destination instructions. The techniques disclosed herein may employed on any instruction, including arithmetic and memory instructions, that indicates one or more destination registers. Supported multiple-destination instructions include general register compare instructions (such as those set forth in Tables 1, 10 and 11), floating point compare instructions, test bit instructions, test NaT bit instructions, floating-point class instructions, load base-increment instructions (such as instruction 2 set forth in Table 1) for general and floating point registers, and store base-increment instructions for general and floating point registers. Such listing is in no way intended to be an exhaustive list.

FIG. 6 illustrates that processing proceeds to from block 604 to block 606. However, one of skill in the art will recognize that one or more operations (not shown) may be performed on the fetched instruction before performing block 606. For example, the instruction may be processed through a decode phase (see 306, FIG. 3) and/or an architectural rename phase (see 308, FIG. 3) of an execution pipeline before entering a µ-op generation stage (see 310, FIG. 3). For alternative embodiments, other operations may also be performed on the fetched instruction before the remaining blocks of FIG. 6 are performed.

As is stated above, a µ-op generator 116 (FIG. 1) may perform blocks 606-612 during the µ-op generation stage (310, FIG. 3). At block 606 standard u-ops are generated for the current instruction. As used herein, the term "standard" u-ops is intended to encompass those micro-ops that are generated for an instruction, regardless of whether the instruction is predicated. That is, even a non-predicated instruction may be decomposed into a plurality of u-ops in order to meet the goal that each micro-op indicates no more than two sources and one destination.

For example, micro-ops 2c and 2d of Table 1 illustrate "standard" micro-ops for a register base update form of instruction (instruction 2 in Table 1). Even if instruction 2 were not predicated, the original instruction nonetheless indicates two registers to be updated—the destination register, r1, and the base register r3. Accordingly, two "standard" micro-ops, 2c and 2d, are generated such that a separate one-destination micro-op is generated for each of the two destination register updates. For illustrative purposes, it can be assumed that the two standard micro-ops 2c and 2d are generated at block 606. Processing then proceeds to block 608.

At block 608 it is determined whether the current instruction is predicated. If not, then the standard micro-ops generated at block 604 are the only micro-ops to be generated for the current instruction. Accordingly, if the predication check at block 608 evaluates to "false," then processing ends at block 614.

If, however, the predication check at block 608 evaluates to "true," then processing proceeds to block 612. At block 612, additional predication-support micro-ops are generated so that each micro-op for the predicated instruction only indicates two inputs. For most instructions, the additional micro-ops generated at block 612 include conditional move instructions and may also include an append instruction for each destination register. After additional micro-ops are generated at block 612, processing ends at block 614.

Figure 7:
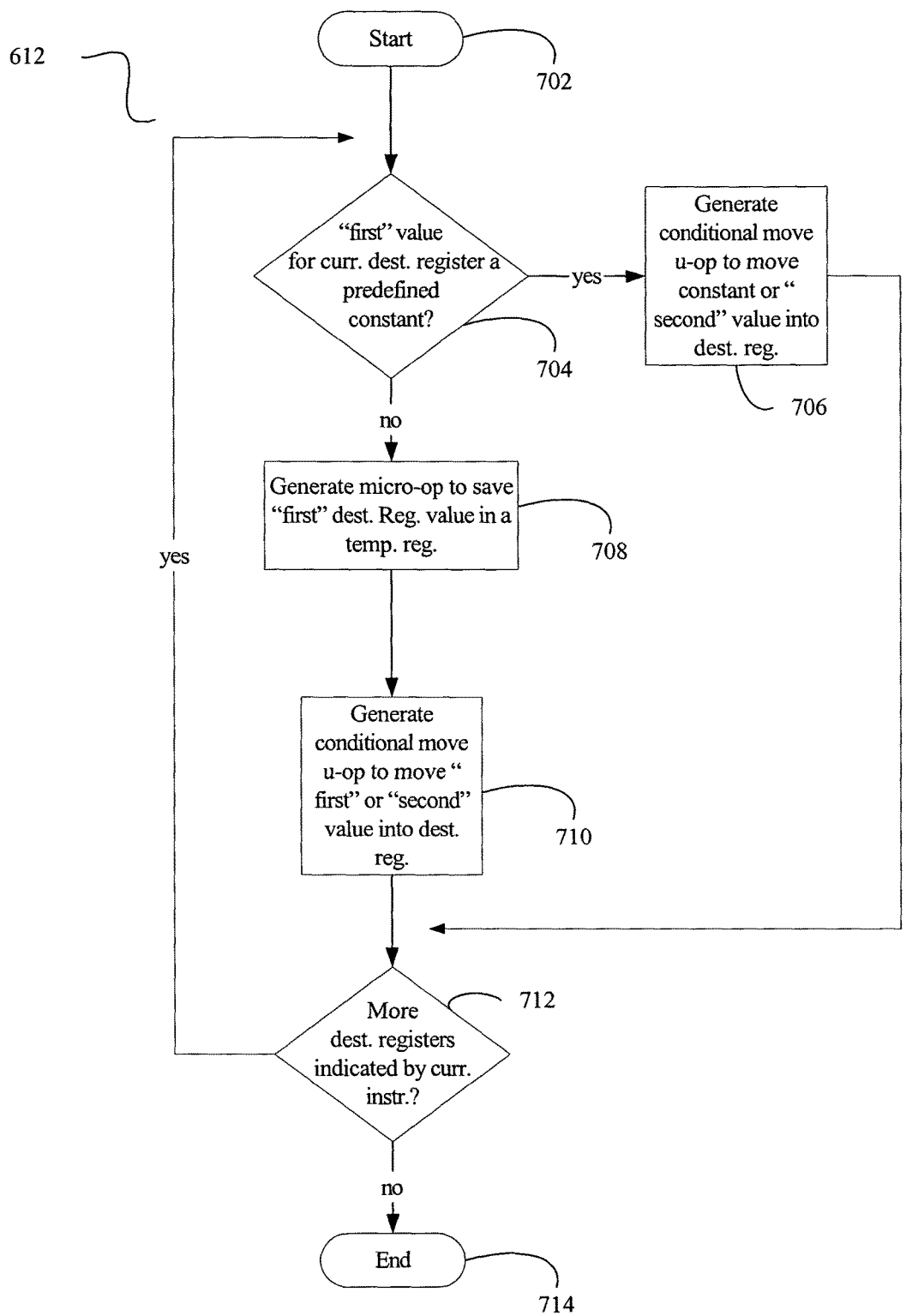
FIG. 7 is a flowchart illustrating further detail for at least one embodiment of a method for generating single-destination micro-ops for a predicated multi-destination instruction.

FIG. 7 illustrates in further detail at least one embodiment of a method for generating additional predication-support micro-ops at block 612. FIG. 7 illustrates that processing for the method 612 begins at block 702 and proceeds to block 704.

At block 704, it is determined whether the "first" value of the current destination register is a predefined constant. Such determination would evaluate to "true," for instance, if the current instruction was an unconditional compare instruction such as that illustrated at instruction 4 of Table 1. For such an instruction, the value to be loaded into the destination register upon a certain condition is a known constant (in this case, the known constant is a zero value). Accordingly, a prior, or "first," value of the destination need not be preserved via an append instruction. FIG. 7 illustrates that, in such case, processing proceeds to block 706. Otherwise, if the check at block 704 evaluates to "false," processing proceeds to block 708.

At block 706, a predication-support micro-op, a conditional move micro-op, is generated in order to conditionally move one of two values into the destination register. The conditional move micro-op generated at block 706 is to move either the known constant value or a computed value into the current destination register for the current instruction. In most cases, the computed value is a value computed by the "standard" micro-ops generated at block 606 (FIG. 6) for the current instruction.

For illustrative purposes, the operation of blocks 704 and 706 is considered in light of sample instruction 4 set forth in Table 1. (It should be noted that, during execution of the method 600 illustrated in FIG. 6, standard micro-ops 4a and 4b are generated for instruction 4 at block 606). The first destination register, p1, is considered at block 704. At block 704 it is determined that a predefined constant value (zero) will be moved into the destination register p1 if the qualifying predicate for the current instruction is not true. Accordingly, block 704 evaluates to "true," and processing then proceeds to block 706.

At block 706, a conditional move micro-op is generated. Continuing with the example of instruction 4 of Table 1, conditional move micro-op 4c is generated at block 706. Micro-op 4c indicates that, if the qualifying predicate for instruction 4 is true, the value of p1 computed by micro-op 4a is to be moved to destination register p1. Micro-op 4c also indicates that, if the qualifying predicate for instruction 4 is false, a zero value is to be moved to register p1.

Processing then proceeds from block 706 to block 712. At block 712, it is determined whether additional destination registers are indicated by the current instruction. Continuing for the example of instruction 4 in Table 1, it would be determined on the first pass of block 712 that an additional destination register, p2, should be considered. Accordingly, processing proceeds back to block 704. If, however, all destination registers for the current instruction have been considered, then processing ends at block 714.

At the second pass through block 704, for our sample instruction, it is again determined that a predefined constant value (i.e., zero) is to be moved to the destination register (p2) if the qualifying predicate for the current instruction is false. Accordingly, processing proceeds to block 706.

At block 706, a conditional move micro-op is generated for the second destination register, p2. Continuing with the example of instruction 4 of Table 1, conditional move micro-op 4d is generated at block 706. Micro-op 4d indicates that, if the qualifying predicate for instruction 4 is true, the value of p2 computed by micro-op 4b is to be moved to destination register p2. Micro-op 4d also indicates that, if the qualifying predicate for instruction 4 is false, a zero value is to be moved to register p2.

Processing then proceeds from block 706 to block 712. At the second pass through block 712 it is determined, for our example, that no further destination registers need be considered for the current instruction. Processing then ends at block 712. As is stated above, it is determined at block 712 whether additional destination registers are indicated by the current instruction. Continuing for the example of instruction 3 in 1, it would be determined on the first pass of block 712 that an additional destination register, p2, should be considered. Accordingly, processing proceeds back to block 704. If, however, all destination registers for the current instruction have been considered, then processing ends at block 714.

For illustrative purposes, FIG. 7 is further considered in light of sample instruction 3 set forth in Table 1. (It should be noted that, during execution of the method 600 illustrated in FIG. 6, standard micro-ops 3c and 3d are generated for instruction 3 at block 606). The first destination register, p1, for the instruction is considered at block 704. At block 704 it is determined that instruction 3, a comp.eq instruction, is not a form of instruction for which a predefined constant value will be moved into the destination register p1 if the qualifying predicate for the current instruction is not true. Accordingly, block 704 evaluates to "false," and processing then proceeds to block 708.

Because the "first" value of p1 will be selected as the output value for p1 if the qualifying predicate for instruction 3 is not true, this value should be saved in a temporary register. Accordingly, at block 708 a predication-support append instruction is generated to save this information. For our example, micro-op 3a is generated for instruction 3 at the first pass of block 708. The operation of the append instruction 3a not only saves the "first" value of p1, but it appends the qp value onto the register as well, as is described above. Processing then proceeds to block 710.

At block 710, a second predication-support micro-op is generated for the current destination register, p1. Continuing with the example of instruction 3 from Table 1, conditional move micro-op 3e is generated at block 710. Micro-op 3e indicates that, if the qualifying predicate for instruction 3 is true, the value of p1 computed by standard micro-op 3c is to be moved to destination register p1. Micro-op 3e also indicates that, if the qualifying predicate for instruction 3 is false, the "first" value of p1 from the temporary register is to be moved to destination register p1. Processing then proceeds to block 712, where it is determined that a second destination register, p2, should be considered. Processing thus proceeds back to block 704.

At the second pass through block 704, for our sample instruction, it is again determined that instruction 3 is not a form of instruction for which a predefined constant value will be moved into the destination register p1 if the qualifying predicate for the current instruction is not true. Accordingly, block 704 again evaluates to "false," and processing then proceeds to block 708.

At the second pass of block 708, a predication-support append instruction is generated to save the "first" value of p2. For our example, micro-op 3b is generated for instruction 3 at the second pass of block 708. The operation of the append instruction 3b appends the qp value onto the "first" value of p2 and saves them both in a temporary register. Processing then proceeds to block 710.

At block 710, a second predication-support micro-op is generated for the current destination register, p2. Continuing with the example of instruction 3 from Table 1, conditional move micro-op 3f is generated at block 710. Micro-op 3f indicates that, if the qualifying predicate for instruction 3 is true, the value of p2 computed by standard micro-op 3d is to be moved to destination register p2. Micro-op 3f also indicates that, if the qualifying predicate for instruction 3 is false, the "first" value of p2 from the temporary register is to be moved to destination register p2. Processing then proceeds to block 712.

At the second pass of block 712, for our sample instruction, it is determined that no further destination registers need be considered. Processing thus ends at block 714.

The foregoing discussion discloses selected embodiments of an apparatus, system and method for implementing single- and multiple-destination instructions, including predicated arithmetic and memory instructions, using single-destination micro-operations. The methods described herein may be performed on a processing system such as the processing systems 100, 100a illustrated in FIGS. 1 and 2.

FIGS. 1 and 2 illustrate embodiments of processing systems 100, 100a, respectively, that may utilize disclosed techniques. Systems 100, 100a may be used, for example, to execute one or more methods implementing predicated instructions using micro-operations, such as the embodiments described herein. For purposes of this disclosure, a processing system includes any processing system that has a processor, such as, for example; a digital signal processor (DSP), a microcontroller, an application specific integrated circuit (ASIC), or a microprocessor. Systems 100 and 100a are representative of processing systems based on the Itanium® and Itanium® 2 microprocessors as well as the Pentium®, Pentium® Pro, Pentium® II, Pentium® III, and Pentium® 4 microprocessors, all of which are available from Intel Corporation. Other systems (including personal computers (PCs) having other microprocessors, engineering workstations, personal digital assistants and other hand-held devices, set-top boxes and the like) may also be used. At least one embodiment of system 100 may execute a version of the Windows™ operating system available from Microsoft Corporation, although other operating systems and graphical user interfaces, for example, may also be used.

Processing systems 100 and 100a include a memory system 150 and a processor 101, 101a. Memory system 150 may store instructions 140 and data 141 for controlling the operation of the processor 101. Memory system 150 is intended as a generalized representation of memory and may include a variety of forms of memory, such as a hard drive, CD-ROM, random access memory (RAM), dynamic random access memory (DRAM), static random access memory (SRAM), flash memory and related circuitry. Memory system 150 may store instructions 140 and/or data 141 represented by data signals that may be executed by the processor 101.

In the preceding description, various aspects of a method, apparatus and system for implementing predicated instructions using micro-operations are disclosed. For purposes of explanation, specific numbers, examples, systems and configurations were set forth in order to provide a more thorough understanding. However, it is apparent to one skilled in the art that the described method and apparatus may be practiced without the specific details. It will be obvious to those skilled in the art that changes and modifications can be made without departing from the present invention in its broader aspects. While particular embodiments of the present invention have been shown and described, the appended claims are to encompass within their scope all such changes and modifications that fall within the true scope of the present invention.

What is claimed is:

1. An apparatus comprising:
   a first register to hold an incoming value;
   a second register; and
   a micro-operation generator to receive a predicated instruction that references at least the first register and in response to receiving the predicated instruction is to decompose the predicated instruction into at least
      a first micro-operation, when executed, to associate a predicate value with the incoming value in the second register, wherein the first micro-operation includes an append micro-operation to append the predicate value to the incoming value in the second register;
      a second micro-operation, when executed, to perform a standard operation to obtain a new value, the new value to be held in the first register; and
      a third micro-operation, when executed, to update the first register with the incoming value in response to the predicate value representing a first value, wherein the third micro-operation includes one or more predication-support micro-operations and wherein the one or more predication-support micro-operations includes a conditional move micro-operation.

2. The apparatus of claim 1, wherein the third micro-operation, when executed, is also to retain the new value in the first register in response to the predicate value representing a second value.

3. The apparatus of claim 1, wherein the predicated instruction that references at least the first register includes a predicated instruction that references at least an architectural register, the first register including a physical register to be mapped to the architectural register, and wherein the second register includes a temporary physical register.

4. The apparatus of claim 3, further comprising renaming mapping logic to map the physical register to the architectural register.

5. The apparatus of claim 1, wherein the predicated instruction is a compare instruction.

6. The apparatus of claim 5, wherein the predicated instruction is an "or" form compare instruction.

7. The apparatus of claim 5, wherein the predicated instruction is an "and" form compare instruction.

8. The apparatus of claim 5, wherein the predicated instruction is an "and"-complement form compare instruction.

9. The apparatus of claim 5, wherein the predicated instruction is an "or"-complement form compare instruction.

10. The apparatus of claim 1, wherein: the predicated instruction is a parallel compare instruction.

11. The apparatus of claim 10, wherein:
    the one or more predication-support micro-operations are to include a first conditional move micro-operation for the first register indicated by the parallel compare instruction; and
    the one or more predication-support micro-operations also include a second conditional move micro-operation for a third register indicated by the parallel compare instruction.

12. The apparatus of claim 11, wherein the instruction is an "and.orcm" form of a parallel compare instruction.

13. The apparatus of claim 10, wherein the instruction is an "or.andcm" form of a parallel compare instruction.

14. The apparatus of claim 1, wherein: the one or more predication support micro-operations includes an append operation to append a qualifying predicate value to the new value.

15. The apparatus of claim 1, wherein: the instruction is a load instruction; and the one or more predication support micro-operations includes an append operation to append a qualifying predicate value to a load address.

16. The apparatus of claim 1, wherein: the instruction is a store instruction; and the one or more predication support micro-operations includes an append operation to append a qualifying predicate value to a store address.

17. A system comprising:
    a memory to store an instruction that indicates a plurality of destination registers; and
    a processor coupled to the memory, wherein the processor includes a microcode engine, in response to receiving the instruction, to generate at least:
       a first micro-operation to associate a predicate value with a first value associated with a first destination register of the plurality of destination registers,
       a second micro-operation to perform a basic functionality operation of the instruction to obtain a second value, and a select micro-operation to select the first or second value to be held in the first destination register based on the predicate value associated with the first value.

18. The system of claim 17, wherein: the memory is a DRAM.

19. The system of claim 17, wherein: associating the predicate value with the first value includes holding the predicate value and the first value in a second register, and wherein the select micro-operation includes a conditional move micro-operation to conditionally move the first value or the second value into the first destination register based on the predicate value associated with the first value.

20. A method comprising:
receiving an instruction that indicates a plurality of destination registers;
in response to receiving the instruction:
generating a first operation, when executed, to log a first value held in a first destination register of the plurality of destination registers;
generating a second operation, when executed, to perform a standard operation associated with the instruction to obtain a new value;
generating a third operation, when executed, to select between the first value and the new value to be held in the first destination register.

21. The method of claim 20, wherein the instruction is a predicated instruction, and wherein generating a first operation, when executed, to log a first value held in a first destination register comprises generating a first append operation, when executed to hold a predicate value appended to the first value in a temporary register.

22. The method of claim 21, wherein the third operation includes a conditional move operation to copy the first value into the first destination register in response to the predicate value indicating a first value and to copy the new value into the first destination register in response to the predicate value indicating a second value.

23. The method of claim 22, wherein the first destination register is an architectural register, and wherein a plurality of physical registers are capable of being mapped to the architectural register to hold a plurality of values associated with the architectural register.

24. The method of claim 20, wherein a translation table is to track mapping of physical registers to architectural registers.

25. The method of claim 20, wherein the first, second, and third operations are Intel Architecture (IA) supported micro-operations.

26. An apparatus comprising:
a micro-operation generator to receive a predicated instruction, the predicated instruction being one of a plurality of instructions, the plurality of instructions to include arithmetic instructions and memory instructions;
the micro-operation generator further to generate a plurality of micro-operations that implement the instruction, wherein the plurality of micro-operations include
a first micro-operation to store a first value in a first destination register,
a second micro-operation to store a second value in a second destination register, which is different from the first destination register, and
a third micro-operation to select the first value or the second value to be stored in the second destination register based on a predication value.

27. The apparatus of claim 26, wherein the predicated instruction is an arithmetic instruction.

28. The apparatus of claim 27, wherein the predicated instruction is an add instruction.

29. The apparatus of claim 27, wherein the predicated instruction is a compare instruction.

30. The apparatus of claim 29, wherein the predicated instruction is an "or" form compare instruction.

31. The apparatus of claim 29, wherein the predicated instruction is an "and" form compare instruction.

32. The apparatus of claim 29, wherein the predicated instruction is an "and"-complement form compare instruction.

33. The apparatus of claim 29, wherein the predicated instruction is an "or"-complement form compare instruction.

34. The apparatus of claim 27, wherein the predicated instruction is a parallel compare instruction.

35. The apparatus of claim 34, wherein the instruction is an "and.orcm" form of a parallel compare instruction.

36. The apparatus of claim 34, wherein the instruction is an "or.andcm" form of a parallel compare instruction.

37. The apparatus of claim 26, wherein the predicated instruction is a memory instruction.

38. The apparatus of claim 37, wherein the predicated instruction is a load instruction.

39. The apparatus of claim 37, wherein the predicated instruction is a store instruction.

40. The apparatus of claim 26, wherein the second value includes a result of a standard micro-operation to provide the basic functionality indicated by the predicated instruction.

41. The apparatus of claim 26, wherein the first value comprises the predication value appended to an incoming value from the second register.

42. The apparatus of claim 26, wherein: the third micro-operation includes a conditional move micro-operation to select the first value or the second value to be moved to the second destination register based on the predication value.

43. The apparatus of claim 42, wherein: the first value is an incoming value of the second destination register; and the second value is a computed value.

44. The apparatus of claim 42, wherein: the first value is an incoming value of the second destination register; and the second value is a constant value. compare instruction.

45. The apparatus of claim 26, wherein: the predicated instruction is a load instruction; and the first micro-operation includes an append operation to append the predication value to a load address.

46. The apparatus of claim 26, wherein: the predicated instruction is a store instruction; and the first micro-operation includes an append operation to append the predication value to a store address.

47. The apparatus of claim 26, wherein: the micro-operation generator is further to decompose the instruction into the plurality of micro-operations such that each of the micro-operations indicates a single destination register.

* * * * *